US012560825B2

(12) United States Patent
Shau et al.

(10) Patent No.: US 12,560,825 B2
(45) Date of Patent: Feb. 24, 2026

(54) ERGONOMIC PROTECTIVE EYEWEAR

(71) Applicants: Alexander Yen Shau, Cedar Park, TX (US); Jeng-Jye Shau, Sunnyvale, CA (US)

(72) Inventors: Alexander Yen Shau, Cedar Park, TX (US); Jeng-Jye Shau, Sunnyvale, CA (US)

( * ) Notice: Subject to any disclaimer, the term of this patent is extended or adjusted under 35 U.S.C. 154(b) by 752 days.

(21) Appl. No.: 17/582,468

(22) Filed: Jan. 24, 2022

(65) Prior Publication Data

US 2022/0146860 A1     May 12, 2022

Related U.S. Application Data

(63) Continuation-in-part of application No. 16/915,972, filed on Jun. 29, 2020, now Pat. No. 11,272,170, which is a continuation-in-part of application No. 16/550,284, filed on Aug. 26, 2019, now Pat. No. 10,747,004, which is a continuation-in-part of application No. 15/984,383, filed on May 20, 2018, now Pat. No. 10,448,004.

(51) Int. Cl.
*G02C 7/14* (2006.01)
*G02B 25/00* (2006.01)
*G02B 27/01* (2006.01)

(52) U.S. Cl.
CPC ............. *G02C 7/14* (2013.01); *G02B 25/002* (2013.01); *G02B 2027/0178* (2013.01)

(58) Field of Classification Search
CPC .. G02C 7/14; G02B 207/0178; G02B 25/002; G02B 27/0172; G02B 27/0176; A16B 5/02141; A16B 5/0205; A61B 5/02438; A61B 5/443; A61B 5/4542; A61B 5/6803
USPC ........................................................ 379/14.02
See application file for complete search history.

(56) References Cited

U.S. PATENT DOCUMENTS

| | | | |
|---|---|---|---|
| 7,542,204 B2 | 6/2009 | Fante et al. | |
| 9,465,235 B2 | 10/2016 | Chang | |
| 9,690,119 B2 | 6/2017 | Garofolo et al. | |
| 2006/0001740 A1 | 1/2006 | Fujie et al. | |
| 2019/0094981 A1* | 3/2019 | Bradski ................ | G06V 40/168 |
| 2023/0179849 A1* | 6/2023 | Garofolo ............. | G02B 25/002 |
| | | | 348/208.4 |

* cited by examiner

*Primary Examiner* — Maria El-Zoobi

(57) ABSTRACT

Using a camera pointing downward, a working area below eye level can be displayed by a headwear for users, so that the user can maintain healthy sitting or standing posture while working on patients or objects located below eye level. Using two or more cameras pointing downward, three-dimensional views with accurate and natural depth perception of a working area can be displayed by a headwear for users. Additional functions including eye protection, zoom-in, zoom-out, on-off, lighting control, overlapping, and teleconference capabilities are also supported using electronic, video and audio devices associated with the headwear. The headwear can also comprise a face shield designed to protect the user from hazardous droplets, aerosols, harmful wavelengths of light, heat, sparks, flash burn, debris and/or flying objects. Contactless control devices can be used to control the functions of the headwear.

5 Claims, 19 Drawing Sheets

FIG. 4(b)

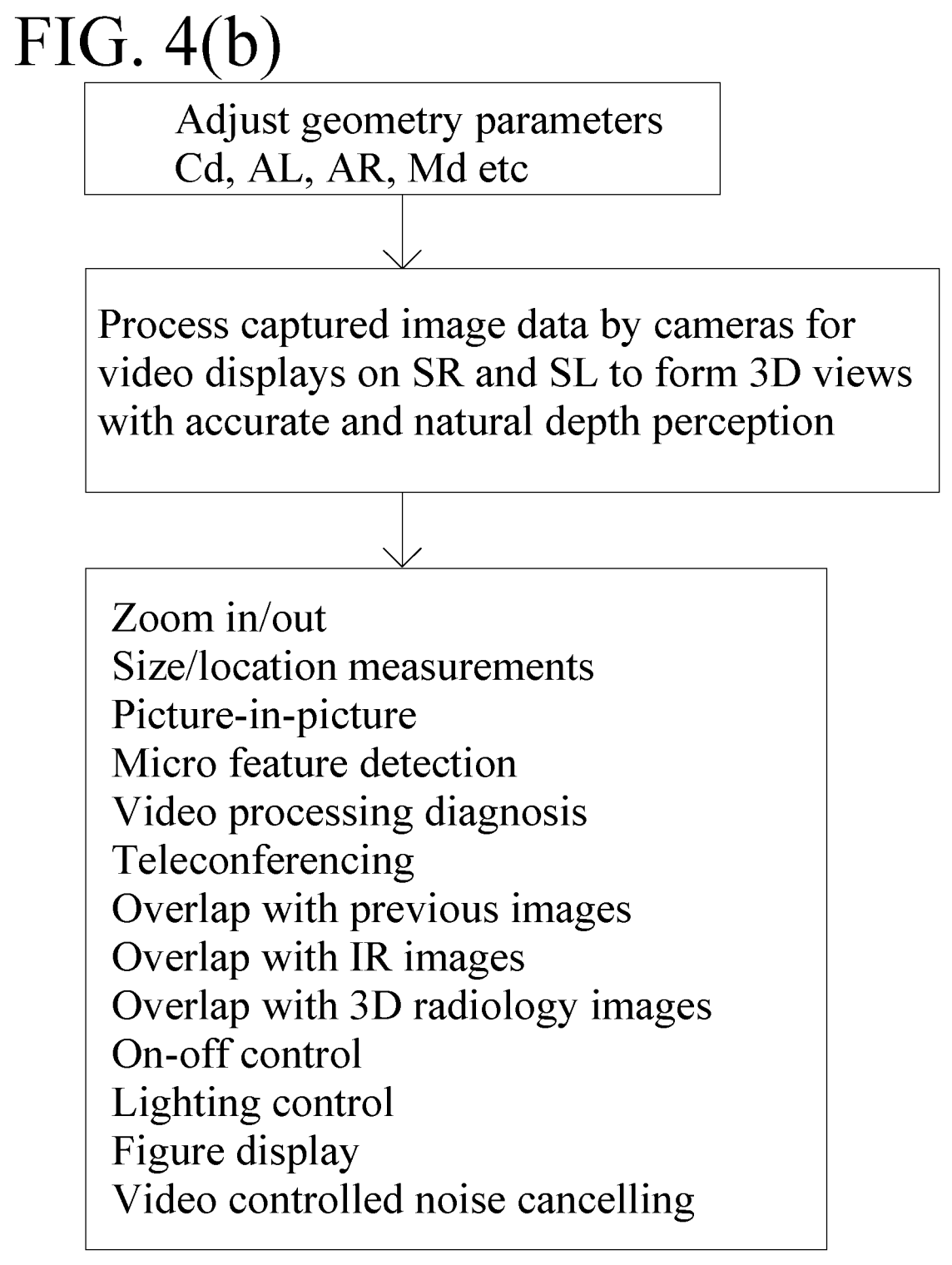

Adjust geometry parameters
Cd, AL, AR, Md etc

Process captured image data by cameras for
video displays on SR and SL to form 3D views
with accurate and natural depth perception Zoom in/out
Size/location measurements
Picture-in-picture
Micro feature detection
Video processing diagnosis
Teleconferencing
Overlap with previous images
Overlap with IR images
Overlap with 3D radiology images
On-off control
Lighting control
Figure display
Video controlled noise cancelling

ERGONOMIC PROTECTIVE EYEWEAR

BACKGROUND OF THE INVENTION

This application relates to protective eyewear of the type worn by medical, surgical, dental, and other professionals, and particularly eyewear that allow users to maintain ideal, healthy working posture while simultaneously providing ideal working vision. The terminology "eyewear" includes "eye glasses", "loupes", "dental loupes", "medical loupes", "surgical loupes", "goggles", "safety glasses", "smart glasses", "protective eyewear", "face shields", "helmets", "welding helmets" and other types of wearable devices worn over the eyes. The terminology "headwear" includes "eyewear" as previously described, "headsets", "headbands", "headgear", "headlights", "headlamps", "hats", "caps", "earphones", "earbuds", "earrings" and other type of wearable devices worn on the head.

This application is a continuation-in-part application of the previous patent application with Ser. No. 16/915,972, with the title "ERGONOMIC PROTECTIVE EYEWEAR", filed by Alexander Shau and Jeng-Jye Shau on Jun. 29, 2020. Patent application Ser. No. 16/915,972 is a continuation-in-part application of the previous patent application with Ser. No. 16/550,284, with the title "ERGONOMIC PROTEC-TIVE EYEWEAR", filed by Alexander Shau and Jeng-Jye Shau on Aug. 26, 2019, that was later issued as U.S. Pat. No. 10,747,004 on Aug. 18, 2020. Patent application Ser. No. 16/550,284 is a continuation-in-part application of the previous patent application with Ser. No. 15/984,383, with the title "ERGONOMIC PROTECTIVE EYEWEAR", filed by Alexander Shau and Jeng-Jye Shau on May 20, 2018, that was later issued as U.S. Pat. No. 10,448,004 on Oct. 15, 2019.

Doctors, surgeons, dentists, hygienists, veterinarians, jewelers, assembly line workers, and other professionals often need to work on a patient or object that requires use of the hands below the normal level of eye sight. FIG. 1(a) illustrates an example of a doctor (111) working on a patient (102) using traditional protective eyewear (112). The Working Declination Angle (WDA) is defined as the angle between the horizontal plane and the line from the viewer's eyes to the working area. Here, the horizontal plane is used to approximate a viewer's unstrained, straight viewing direction while sitting or standing with ergonomically healthy posture. For most people, the Working Declination Angle (WDA) is larger than 45 degrees, and is often larger than 60 degrees. Using traditional protective eyewear (112), the doctor (111) needs to bend the head, neck, or back, and/or use excessive downward eye tilt in order to view the working area clearly, as shown in FIG. 1(a). The doctor (111) frequently needs to hold this uncomfortable and unhealthy posture for long periods of time throughout a working day. Such unfavorable working posture frequently results in back, neck, shoulder, and/or eye strain, causing fatigue that can degrade the quality of the operation and also lead to health problems for the professional.

The most common prior art solution for this problem is to wear specialized eyewear (122) using loupes or magnification eye pieces (124) arranged in an Eyewear Declination Angle (EDA), as illustrated in FIG. 1(b). The Eyewear Declination Angle (EDA) is defined as the angle between the eyewear viewing direction and the viewing direction of the image capturing device(s) on the eyewear, as illustrated by the example in FIG. 1(b). The eyewear viewing direction is defined as the unstrained, straight viewing direction through the eyewear, approximately parallel to the horizontal plane when the user sits or stands with ideal, healthy posture. An image capturing device can be an eye piece, camera, or other optical and/or electronic device. For the case in FIG. 1(b), the eyewear declination angle (EDA) of the magnification eye pieces (124) allows the doctor (121) to view working areas with less bending of the neck and back, as illustrated in FIG. 1(b). However, due to space limitations, the achievable eyewear declination angle (EDA) of the magnification eye pieces (124) is typically limited to be significantly smaller than the working declination angle (WDA). Furthermore, use of such specialized eyewear (122) still requires the user to strain the eyes in a downward direction. It provides a partial solution to the problem, but it does not solve the problem adequately. Professionals are still required to strain the back, neck, shoulders, and/or eyes to achieve proper working vision, though to a lesser degree when compared with the traditional protective eyewear in FIG. 1(a).

Chang in U.S. Pat. No. 9,465,235 disclosed a through-the-lens loupe with improved eyewear declination angle. Holes are opened on the viewing windows of the eyewear to allow larger built-in eyewear declination angles. However, the angle is still not large enough to allow the doctor to maintain ideal ergonomic posture while working.

Fante et al. in U.S. Pat. No. 7,542,204 disclosed a method to improve eyewear declination angle using optical deflectors. The resulting microscopes are larger and heavier than the prior art example in FIG. 1(b). Fante may help reduce problems caused by the working declination angle, but the added weight of the deflectors may also cause ergonomic problems.

Fujie et al in U.S. patent application Ser. No. 11/090,820 disclosed a system for dental diagnosis and treatment that includes a camera which can capture moving images in the patient's oral cavity, and the camera can be fixed near the patient's mouth. The image captured by the camera is displayed on a TV screen or monitor installed at a position where the dentist can see. Using video image processing methods, the system can invert the image in the vertical direction and reverse the image in the lateral direction. The capabilities of Fujie's image processing are limited to image reversion. Additionally, the image is taken from a camera directly facing the mouth of a patient, which is not the same position of view from which dentists are familiar with working. Using this system, dentists need to operate with a different field of view from those with which they are trained. Furthermore, images displayed on the monitor are two-dimensional views which lack depth perception. Depth perception is defined as the visual ability to perceive the world in three dimensions, the ability to judge the distance of objects, and the ability to perceive the spatial relationship of objects at different distances. This information is critical for operations requiring precise hand-eye coordination. Fujie may help reduce the ergonomic problems caused by unfavorable posture, but with this system, users need to spend time re-training themselves to operate in an unfamiliar manner.

Garofolo et al in U.S. Pat. No. 9,690,119 disclosed a device that is equivalent to a virtual reality eyewear with an added centered camera system. Images of a working area captured by the centered camera are displayed on the screen of the virtual reality eyewear, allowing the user to view the working area while working with ergonomically healthy posture. However, an optical system relying on a single, centered camera cannot provide three-dimensional views with accurate and realistic depth perception. Garofolo's camera points horizontally forward at vision redirecting mechanisms, instead of pointing directly downward at the patient or object. Garofolo relies on these additional vision redirecting mechanisms to view below eye level, and these additional mechanisms add more weight to the device. This increased weight will make the device heavier and less ergonomic. Garofolo's field of view is also limited by the size of his vision redirecting mechanisms. An increase in the size of Garofolo's vision redirecting mechanisms or mirrors would increase the field of view, but again, such a size increase would simultaneously add unnecessary weight and volume to the eyewear. These limitations significantly hinder Garofolo's ability to support professional operations that require precise hand-eye coordination.

Borenstein in US Patent Application publication number 2016/0104453 disclosed cameras that are embedded in front of the lenses of an eyewear, and these cameras point in a forward direction to enhance what the user can already see with his/her own eyes. Borenstein's cameras point forward, instead of pointing downward with an adjustable declination angle. Because of this critical structure difference, Borenstein's cameras are not useful in solving the aforementioned ergonomic problem faced by dentists, doctors and other professionals. Borenstein does not allow such professionals to see objects or patients at a large working declination angle without elimination or minimization of neck, back, shoulder, or eye strain.

These prior art devices provide partial solutions to the problem, but they do not solve the problem adequately. It is therefore desirable to provide eyewear for medical, surgical, dental, and other professionals that can allow the user to work from his/her trained working positions, while simultaneously operating with ideal ergonomic posture. Trained working positions are the user's physical positions relative to the working area, while the user is performing work on the working area, from which the majority of people in the user's profession have been trained. The working area can be a patient, surface or object(s). For example, most right-handed dentists have been trained to perform dentistry while positioned in the 7 to 1 o'clock positions relative to the patient's head. As another example, most left-handed dentists have been trained to perform dentistry while positioned in the 11 to 5 o'clock positions relative to the patient's head. It is also essential that the eyewear can provide accurate three-dimensional views with realistic and natural depth perception, from the user's trained working positions. It is additionally essential that the eyewear can provide additional working aids using image processing technology and audio signal processing technology. Other professionals who are required to work below a horizontal level of eye sight, such as dental hygienists, veterinarians, laboratory technicians, welders, assembly line workers, and jewelers, will also benefit from this invention.

Due to the global coronavirus pandemic, personal protective equipment (P.P.E.) requirements for numerous professions have recently changed. Healthcare professionals such as dentists are at high risk for contracting the virus from aerosols or droplets released during common patient procedures. As a result, dentists are now adding items such as N-95 masks and full face shields to their daily protective wear. Face shields are worn over the eyes, but also extend further downward to add protection over the nose and mouth. Face shields may also extend upward above the eyes, to add protection over the user's forehead and hair. Thus, face shields can protect not only the eyes, but also the rest of the face. With face shield eyewear being added to everyday P.P.E. comes the need to ensure that face shield users are adequately able to view objects or patients located below eye level, while working with ergonomically healthy sitting or standing posture and with minimal to no straining of the eyes. Simultaneously, it is also necessary to ensure that these face shields are minimizing the user's exposure to hazardous droplets or aerosols. Such face shields can also be used to protect the user's face from other hazards such as harmful wavelengths of light, heat, sparks, flash burn, debris and flying objects. Thus, these eyewear can be beneficial not only for healthcare professionals, but also for other professionals who require full facial protection while working.

Additional variations are discussed in this patent application: the camera that captures the working area does not have to be attached to the eyewear, a head band can be used to make the electronic device more stable on the head, and the electronic device can be controlled by a contactless control device. A contactless control device is a device that uses changes in magnetic fields, changes in electrical outputs of one or more motion sensors, changes in sound waves, or changes in electromagnetic waves to control an electronic device. Examples of contactless control devices include magnetic sensors that are activated by magnetic fields, optical switches that are activated by electromagnetic waves, voice recognition devices that are activated by voice patterns, image recognition devices that are activated by image patterns, and motion sensors that are activated by the motion of users. Examples of electronic devices include the headwear illustrated in FIGS. 3(a-j), and light sources that can attach to dental loupes and other headwear. One example of a magnetic sensor is the TCS40DLR magnetic sensor made by Toshiba. As defined herein, the gravity acceleration vector (g) is a vector that points towards the center of gravity of the Earth, with an amplitude equal to approximately 9.8 meters/second$^2$. An electric motion sensor is an electronic device that provides electrical outputs that are related to the motion of the motion sensor. Three of the most commonly used electric motion sensors are accelerometers, compasses and gyroscopes. An accelerometer is an electronic device that provides electrical outputs that are approximately proportional to the vector components of (Acc+g), where Acc is the acceleration vector experienced by the accelerometer, and g is the gravity acceleration vector. Typical accelerometers measure the vector components (Ax, Ay, Az) of (Acc+g) along three vertical axes (x, y, z) defined by the devices. Ax is the magnitude of the vector component of (Acc+g) along the x-axis and is equal to the dot product of (Acc+g) and the unit vector along the x-axis. Ay is the vector component of (Acc+g) along the y-axis and is equal to the dot product of (Acc+g) and the unit vector along the y-axis. Az is the vector component of (Acc+g) along the z-axis and is equal to the dot product of (Acc+g) and the unit vector along the z-axis (some accelerometers measure the vector components (Ax, Ay) along two vertical axes without the third axis). When the amplitude of Acc is close to zero, vector (Ax, Ay, Az) becomes equivalent to g, and the outputs of an accelerometer can be used to determine the orientation of the motion sensor relative to the gravity acceleration vector (g). Therefore, accelerometers are often called g-sensors. A gyroscope is a device used for measuring or maintaining orientation and angular velocity. An electronic gyroscope is a gyroscope that has an electronic interface to provide outputs in electronic signals; sometimes electronic gyroscopes are also called gyrometers. An electronic compass is a magnetometer that has an electronic interface to provide outputs in electronic signals that are related to the orientation of the device relative to a nearby magnetic field. Accelerometers, gyroscopes, magnetometers, or a combination of these sensors are also called "Inertial Measurement Units" (IMU). One example of an IMU is the LIS2HH12 accelerometer made by ST Microelectronics; another example is the ICM-20948 9-axis motion tracking device made by TDK InvenSense, which has a gyroscope, an accelerometer, and a compass, while all three motion sensors are packaged in one integrated circuit.

SUMMARY OF THE PREFERRED EMBODIMENTS

A primary objective of the preferred embodiments is, therefore, to provide eyewear that allow users to view working areas below the horizontal plane while maintaining ideal, healthy sitting or standing posture. Another primary objective is to provide eyewear that allow users to view three-dimensional video images of working areas with accurate and natural depth perception. Another primary objective is to provide eyewear that allow professionals to work from their trained working positions. Other objectives are to provide functions including eye protection, zoom-in, zoom-out, on-off, lighting control, overlapping, and teleconference capabilities using electronic, video and audio devices attached to the eyewear. These and other objectives can be achieved by attaching one or more cameras to the eyewear, along with video display devices, audio devices, lighting, and other supporting components as illustrated in the following paragraphs. Another objective is to provide active noise cancellation capability on accessory earphones. Another objective is to display timely images for the eyewear. Another objective is to work with face shields. Another objective is to use magnetic sensors to control the electronic device. Another objective is to use voice recognition to control the electronic device. Another objective is to use motion sensors to control the electronic device.

While the novel features of the invention are set forth with particularly in the appended claims, the invention, both as to organization and content, will be better understood and appreciated, along with other objects and features thereof, from the following detailed descriptions taken in conjunction with the drawings.

DETAILED DESCRIPTION OF THE PREFERRED EMBODIMENTS

Figure 1A:
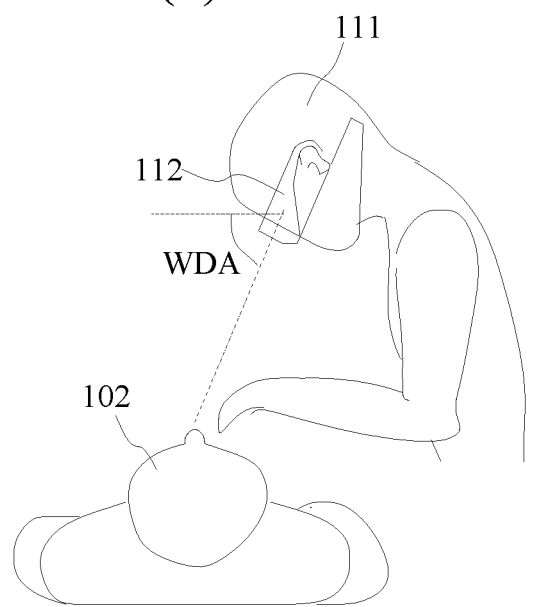
FIG. 1(a) is a symbolic diagram that shows a doctor treating a patient while wearing traditional, prior art protective eyewear.
Figure 1B:
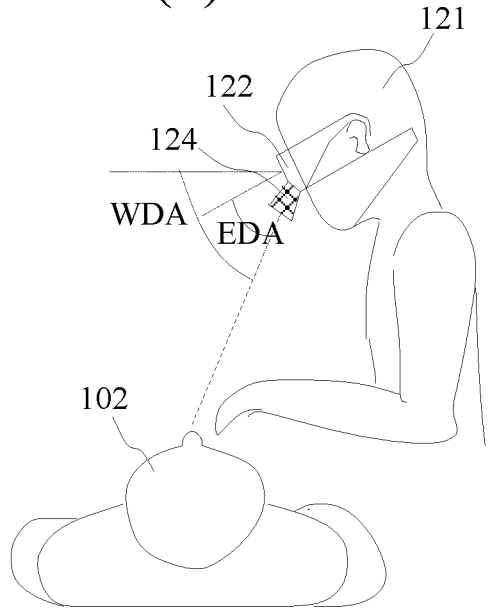
FIG. 1(b) is a symbolic diagram that shows a doctor treating a patient while wearing a prior art eyewear that has magnification eye pieces, or loupes, with an eyewear declination angle.
Figure 2A:
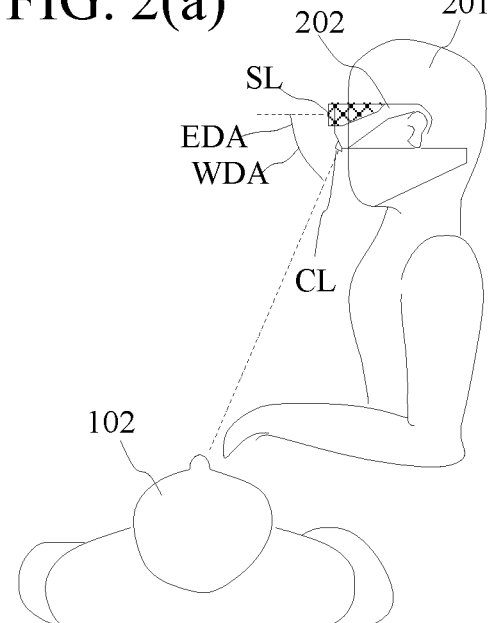
FIG. 2(a) is a symbolic diagram that shows a doctor wearing an exemplary embodiment of this patent application.
Figure 3A:
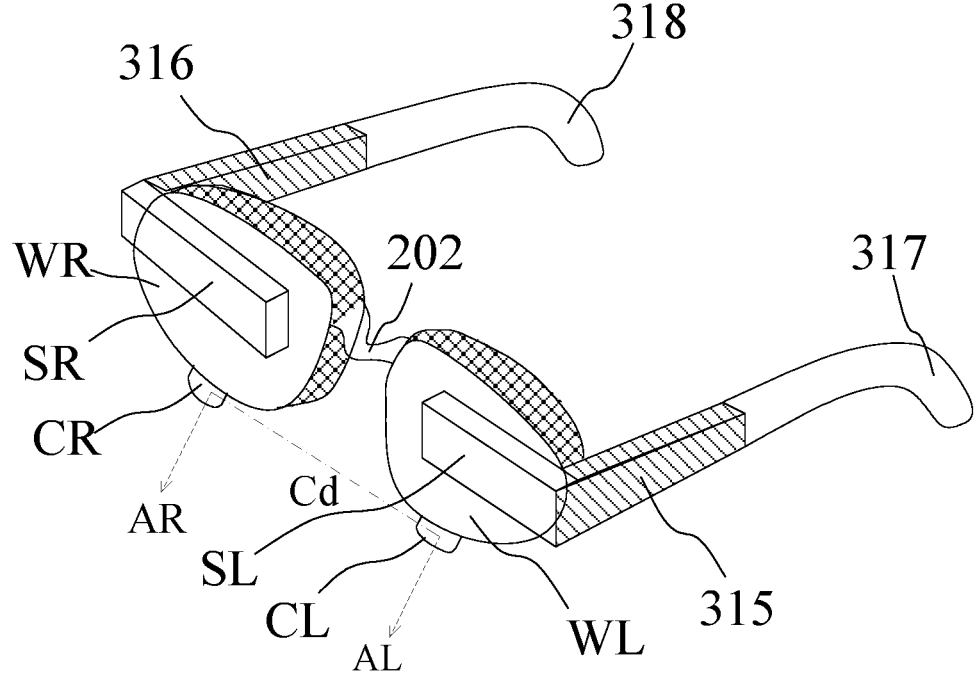
FIG. 3(a) illustrates exemplary structures of the eyewear in FIG. 2(a)

FIG. 2(a) is a symbolic diagram that shows a doctor (201) wearing an exemplary embodiment of an eyewear (202) in this patent application. FIG. 3(a) illustrates exemplary structures of the eyewear in FIG. 2(a). This eyewear (202) comprises a pair of viewing windows (WL, WR). The user's right eye views through the right viewing window (WR), and the user's left eye views through the left viewing window (WL). A right-eye-side camera (CR) is placed on or near the bottom of the right viewing window (WR), and a left-eye-side camera (CL) is placed on or near the bottom of the left viewing window (WL), as shown in FIG. 3(a). These cameras (CR, CL) can also be placed in many other locations, such as on or near the top of the viewing windows (WR, WL), or on or near the sides of the viewing windows (WR, WL). These cameras (CR, CL) can be equipped with built-in light sources and flashes aligned with the cameras (CR, CL). The light sources can also have color filters that allow the user to change the wavelengths of emitted light. Users have the option to detach or reposition these cameras (CR, CL). A right-eye video display device (SR) is placed near or in front of the right viewing window (WR), and a left-eye video display device (SL) is placed near or in front of the left viewing window (WL), as illustrated in FIG. 3(a). The video images formed by the right-eye video display device (SR) and the left-eye video display device (SL) are at or near a horizontal orientation in front of the user, so that the user is able to view objects or patients located below eye level on the video images, while working with ergonomically healthy sitting or standing posture and with minimal to no straining of the eyes. Users have the option to detach part or all of these video display devices (SR, SL), turn them off, or move them out of sight. It is desirable to make the video display devices (SR, SL) using materials that are transparent or partially transparent while not in use. This allows for normal everyday vision through the eyewear with the video display devices (SR, SL) placed in front of the user, when the electronic functions of the eyewear have been switched off. The video display devices (SR, SL) can also be built-in to become part of the viewing windows (WR, WL) themselves. The distance (Cd) between the cameras (CR, CL) is typically adjusted to be about the same as the distance between the pupils of the user, or the interpupillary distance of the user. However, this distance (Cd) can also be adjusted to be wider or narrower than the user's interpupillary distance. The viewing direction (AR) of the right-eye-side camera (CR) and the viewing direction (AL) of the left-eye-side camera (CL) can be adjusted not only in a vertical direction but also in a horizontal direction with total freedom. AR and AL are typically adjusted to have the same angle relative to the eyewear viewing direction while focusing on a targeted working area, as illustrated in FIG. 3(a). The Eyewear Declination Angle (EDA) of the eyewear (202) is defined as the angle between the eyewear viewing direction and the viewing directions (AR, AL) of these cameras (CR, CL). These viewing directions (AR, AL) can be adjusted manually, automatically, or with a contactless control device. Unlike prior art eyewear, there is no space limitation in adjusting the viewing directions (AR, AL) of the cameras (CR, CL). Typically, the eyewear declination angle (EDA) of the eyewear is adjusted to be about the same as the working declination angles (WDA) shown in FIG. 1(a, b), and the doctor (201) can operate in healthy sitting or standing posture, as illustrated in FIG. 2(a). The geometry of these cameras (CR, CL) allows users to view three-dimensional video images of working areas with the video display devices (SR, SL), with accurate and natural depth perception. The eyewear allows doctors to work from familiar doctor-patient working positions with which they have been trained. Supporting components (315, 316), such as video signal processing units, optical control units, audio signal processing units, memory devices, communication circuits, or power sources, can be placed in the sides (317, 318) of the eyewear, in the front of the eyewear, or placed externally. The total weight of the eyewear (202) is light enough so that it is not burdensome to the user.

Figure 3B:
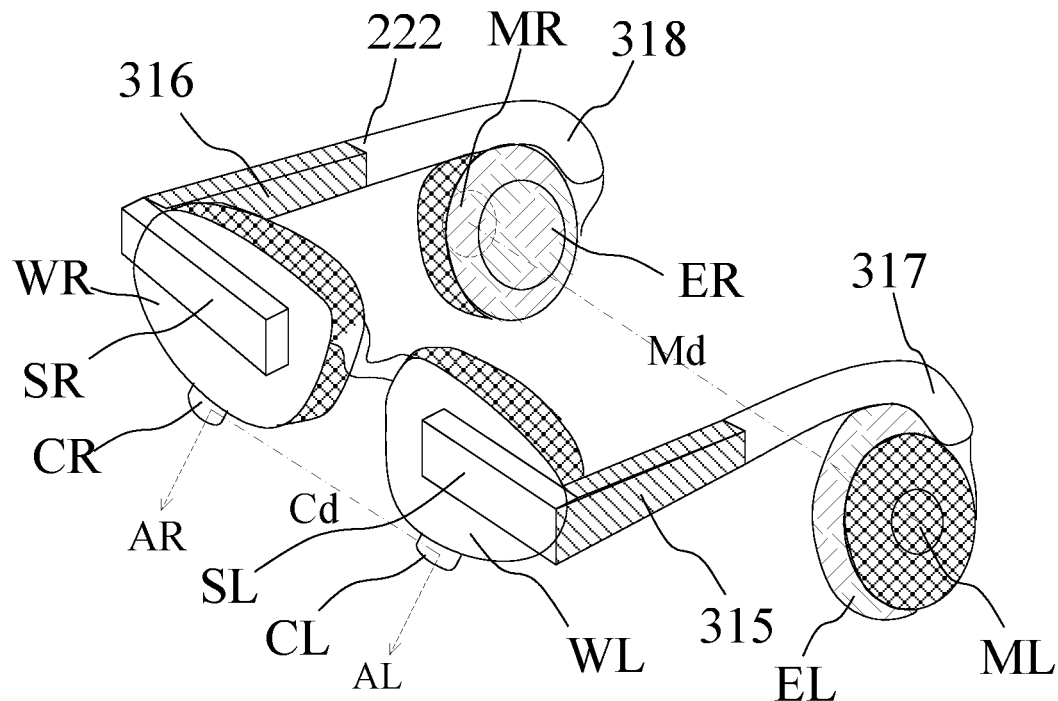
FIG. 3(b) illustrates exemplary structures of the eyewear in FIG. 2(b)
Figure 3C:
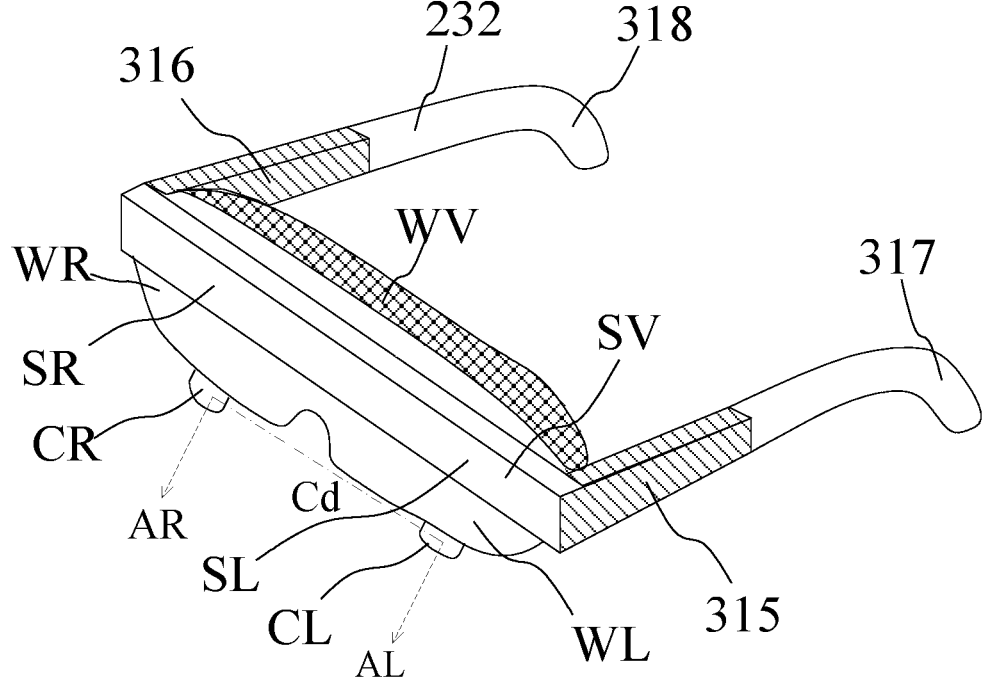
FIG. 3(c) illustrates exemplary structures of an eyewear (232) of this patent application that has an integrated viewing window (WV) and an integrated video display (SV)

While the preferred embodiments have been illustrated and described herein, other modifications and changes will be evident to those skilled in the art. It is to be understood that there are many other possible modifications and implementations so that the scope of the invention is not limited by the specific embodiments discussed herein. For example, in FIG. 3(a, b) the right-eye and left-eye video display devices (SR, SL) exist as separate devices. However, the video display device(s) of this patent application can also exist as one single video display device (SV) that has separate display areas (SR, SL) for the right and left eyes, as shown in FIG. 3(c). Likewise, in FIG. 3(a, b) the right and left viewing windows (WR, WL) are separate structures, but can also exist as one single viewing window (WV) that has separate areas (WR, WL) for the right and left eyes, as shown in FIG. 3(c). The video display devices (SR, SL, SV) can be separate structures from the viewing windows (WR, WL, WV), or can also be built-in to become part of the viewing windows themselves. The viewing windows and/or the video display devices can be made of multiple different materials, such as light emitting diodes (LEDs), organic light emitting diodes (OLEDs), projectors, or optical wave guides that utilize total reflection to bring video images to the user. The eyewear may also allow users to work in positions outside of their trained working positions, while maintaining ergonomically healthy sitting or standing posture and with minimal to no straining of the eyes.

Figure 2B:
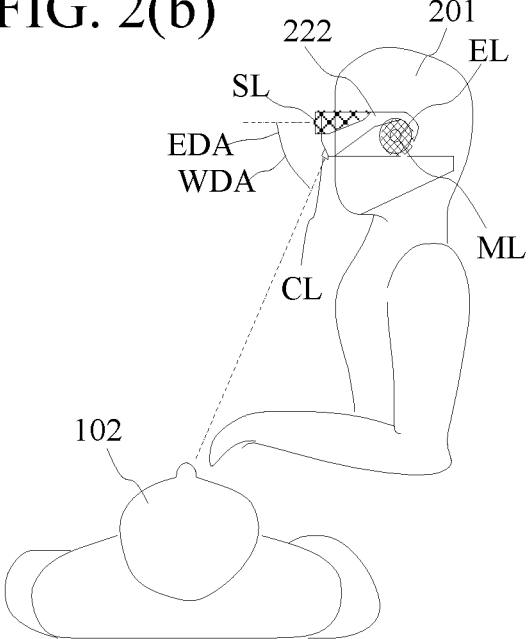
FIG. 2(b) is a symbolic diagram that shows a doctor wearing another exemplary embodiment of this patent application that is equipped with audio devices.
Figure 2C:
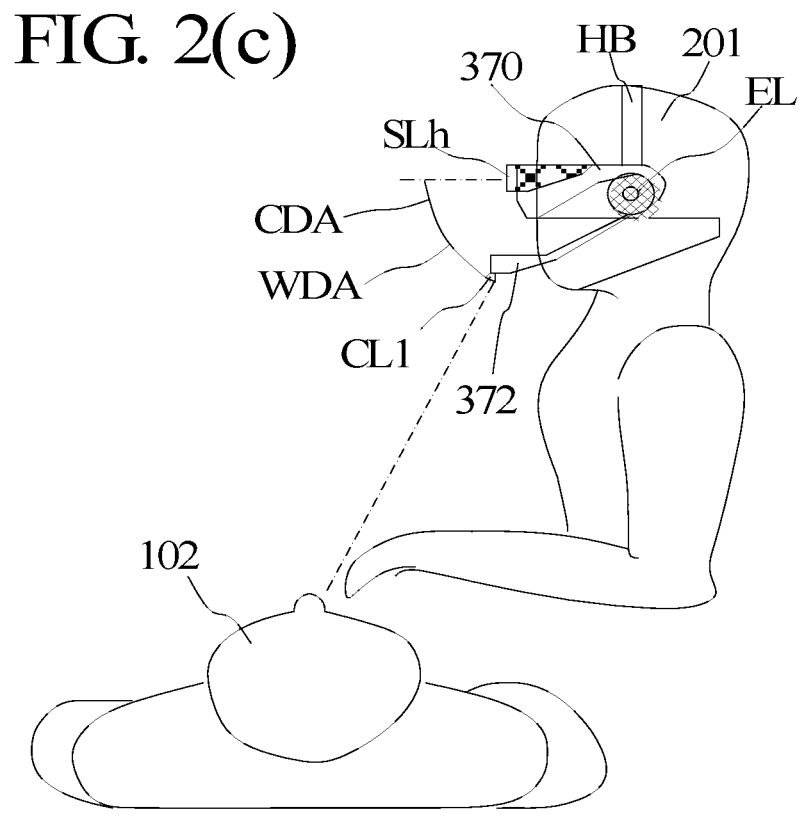
FIG. 2(c) is a symbolic diagram that shows a doctor wearing another exemplary embodiment of this patent application that places one or more cameras on or near a microphone worn by the user.
Figure 2D:
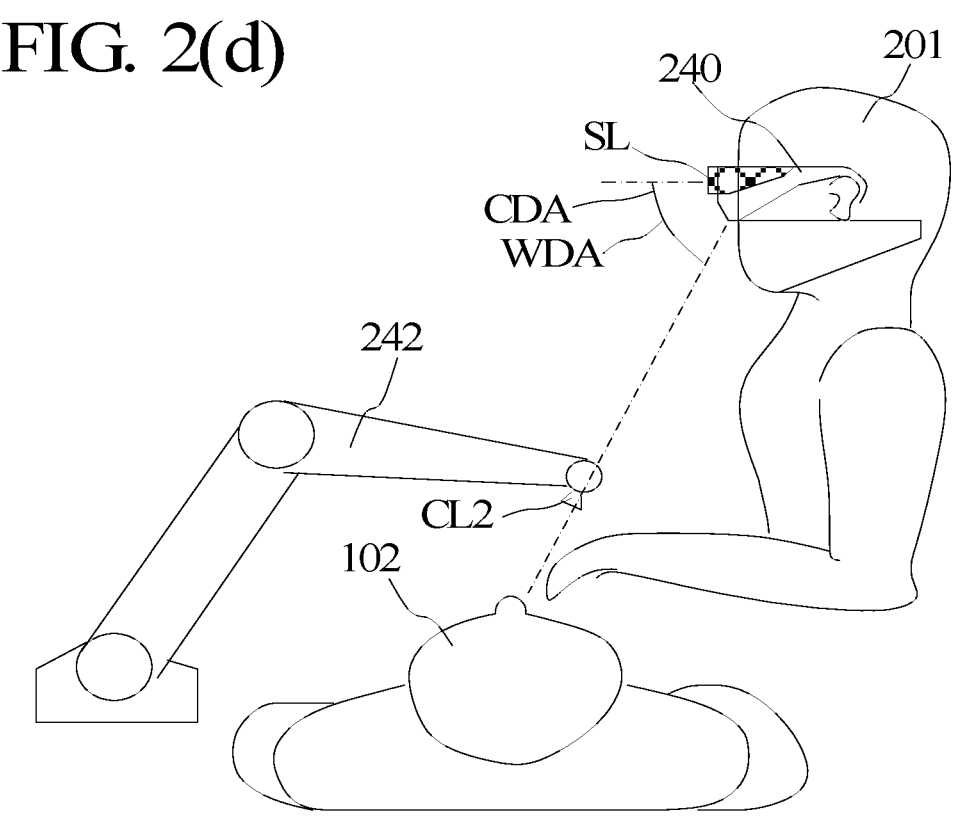
FIG. 2(d) is a symbolic diagram that shows a doctor wearing another exemplary embodiment of this patent application that places one or more cameras on an arm attached to a nearby fixture.

For another example, FIG. 2(b) is a symbolic diagram that shows a doctor (201) wearing an exemplary embodiment of an eyewear (222) of this patent application that is equipped with audio devices (EL, ML). FIG. 3(b) illustrates exemplary structures of the eyewear in FIG. 2(b). This eyewear (222) comprises the same components as the eyewear (202) in FIG. 3(a), but with an added pair of earphones (ER, EL) and a pair of microphones (MR, ML), as shown in FIG. 3(b). The distance (Md) between these microphones (MR, ML) and earphones (ER, EL) can be approximately the same as the distance between the ears of the user. The microphones (MR, ML) can also be positioned closer to the mouth of the user. The user may speak voice commands to control the on-off, zoom-in, zoom-out, eyewear declination angle, lighting, wavelength filtering, camera distance, overlapping images, and various other functions of the eyewear. Alternatively, the user may also control the eyewear through use of a connected device, through use of a remotely controlled external device, through use of various types of contactless control devices, or through use of an automated control system. A remotely controlled external device can exist in many different forms, such as a foot pedal, bracelet, watch, or a ring.

Figure 4A:
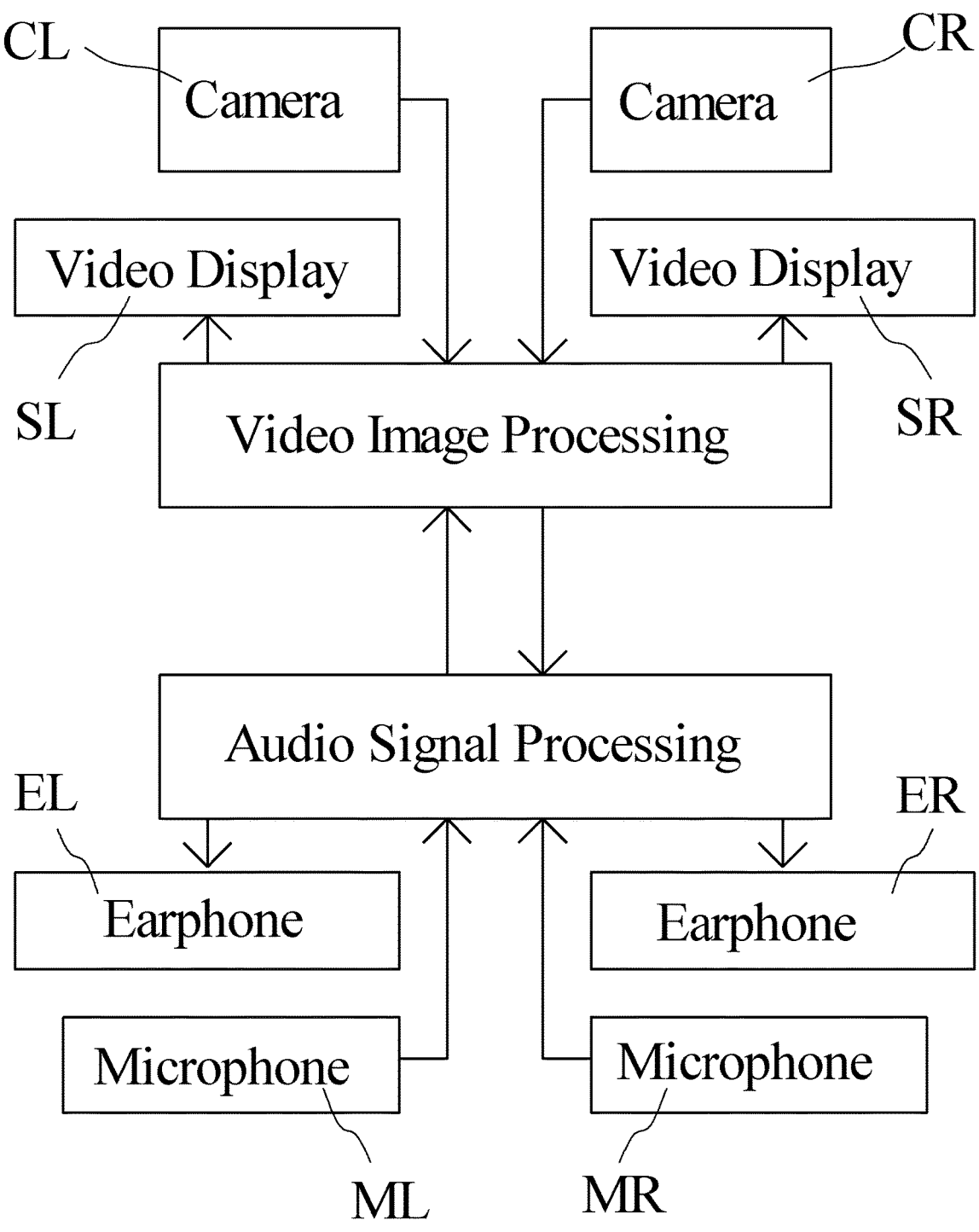
FIG. 4(a) is a simplified symbolic block diagram illustrating the structures of the eyewear (222) in FIG. 3(b)
Figure 4C:
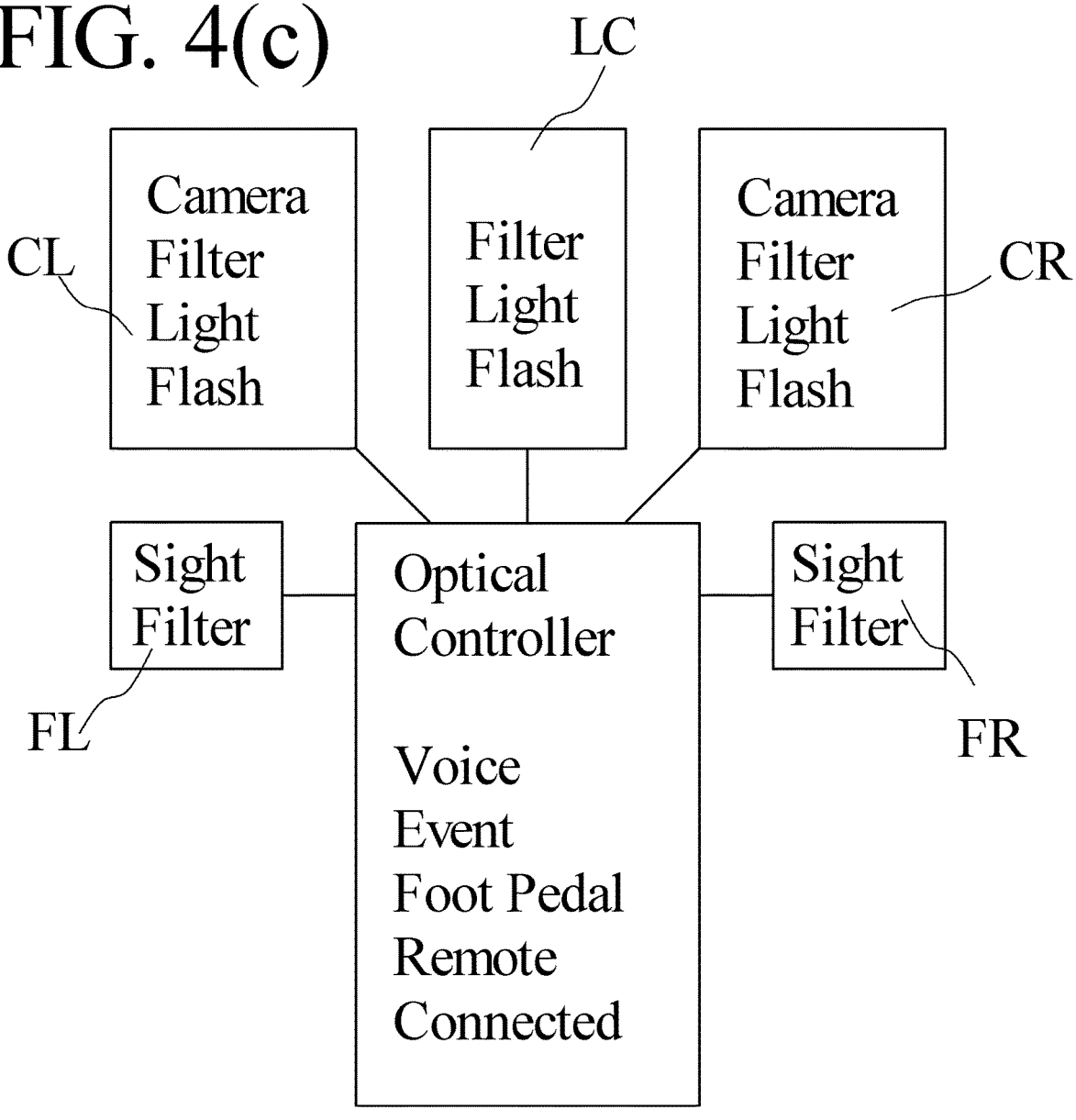
FIG. 4(c) is a simplified symbolic block diagram for an exemplary optical controller of the eyewear (242) in FIG. 3(d)

FIG. 4(a) is a simplified symbolic block diagram illustrating the structures of the eyewear (222) in FIG. 3(b). The right-eye-side camera (CR) and the left-eye-side camera (CL) capture the right and left views that the user (201) wishes to see. These views are then processed and displayed by the right-eye video display device (SR) and the left-eye video display device (SL) in real-time. Display in real-time means that the delay time from the moment images are captured by the cameras to the moment in which the images are shown by the video displays is short enough so that the user does not feel significant delay. For example, if the delay time due to image processing is shorter than 0.1 seconds, then there should be less than 0.1 seconds between the moment the cameras capture an image to the moment the image is shown by the video display devices. The distance (Cd) between the two cameras (CR, CL) is typically about the same as the distance between the pupils of the user (201), but this distance (Cd) can also be wider or narrower than the interpupillary distance of the user. The viewing directions (AR, AL) of the two cameras (CR, CL) are typically adjusted to have the eyewear declination angle (EDA) approximate the working declination angle (WDA). Therefore, when the user (201) views the video images from the video displays (SR, SL) through both of his/her eyes, the user sees a three-dimensional view with the same or similar depth perception as if the user were looking downward with his/her own eyes. The video images from the video displays (SR, SL) are located on the viewing windows (WR, WL) at or near a horizontal orientation, so that the user can view the working area on the video images with minimal to no strain of the eyes, while maintaining ergonomically healthy sitting or standing posture as illustrated in FIG. 2(*a*, *b*).

While the preferred embodiments have been illustrated and described herein, other modifications and changes will be evident to those skilled in the art. It is to be understood that there are many other possible modifications and implementations so that the scope of the invention is not limited by the specific embodiments discussed herein. For example, in FIG. 3(*b*), the eyewear features two earphones (ER, EL) and two microphones (MR, ML). However, the eyewear of this patent application can also feature just one earphone and just one microphone, with the user electing where to place the single earphone and the single microphone. The eyewear can also feature one or two earphones without any microphones. The eyewear can also feature one or two microphones without any earphones. The eyewear can also feature one microphone and two earphones, or one earphone and two microphones. The microphone(s) may also be placed in a wide variety of locations, such as on the user's clothing, on the user's ears, on the sides of the eyewear, on the front of the eyewear, or closer to the user's mouth. Eyewear of this patent application allow the users to see their preferred working three-dimensional views with natural and realistic depth perception, while maintaining ergonomically healthy posture. Using video image processing technology and audio signal processing technology, the eyewear can also support many other functions.

FIG. 4(*b*) is a flow chart illustrating exemplary signal processing procedures for the eyewear (222) in FIG. 3(*b*). The user adjusts geometry parameters such as the distance (Cd) between the cameras (CR, CL), viewing directions of the cameras (AR, AL), the distance (Md) between the earphones (ER, EL) and microphones (MR, ML), the working distance between the eyewear and the user's hands, and other related geometry parameters. Those parameters can be adjusted manually, automatically, or with a contactless control device. Knowing these geometry parameters, image processing technology is able to calculate and display realistic video images from the video data captured by the cameras (CR, CL). The user can zoom in or zoom out as he/she wishes, while image processing can display three-dimensional views with correct magnification and depth perception with the video displays (SR, SL), all with the user maintaining healthy upright posture. The on-off, zoom in-zoom out, and other command features can be triggered by voice commands or voice recognition using microphones (MR, ML) supported by audio signal processing technology. These commands can also be given without voice control. Given geometry parameters, image processing can also measure the size of different objects that the user chooses to measure. It is also able to display 360-degree views of an object the user chooses. Image signal processing can help the user detect and highlight features that are difficult to detect with the naked eye, such as micro-fractures, small cavities, or discolored areas. The user can take pictures with the cameras, and save these pictures as part of the patient's record for future reference.

Figure 5:
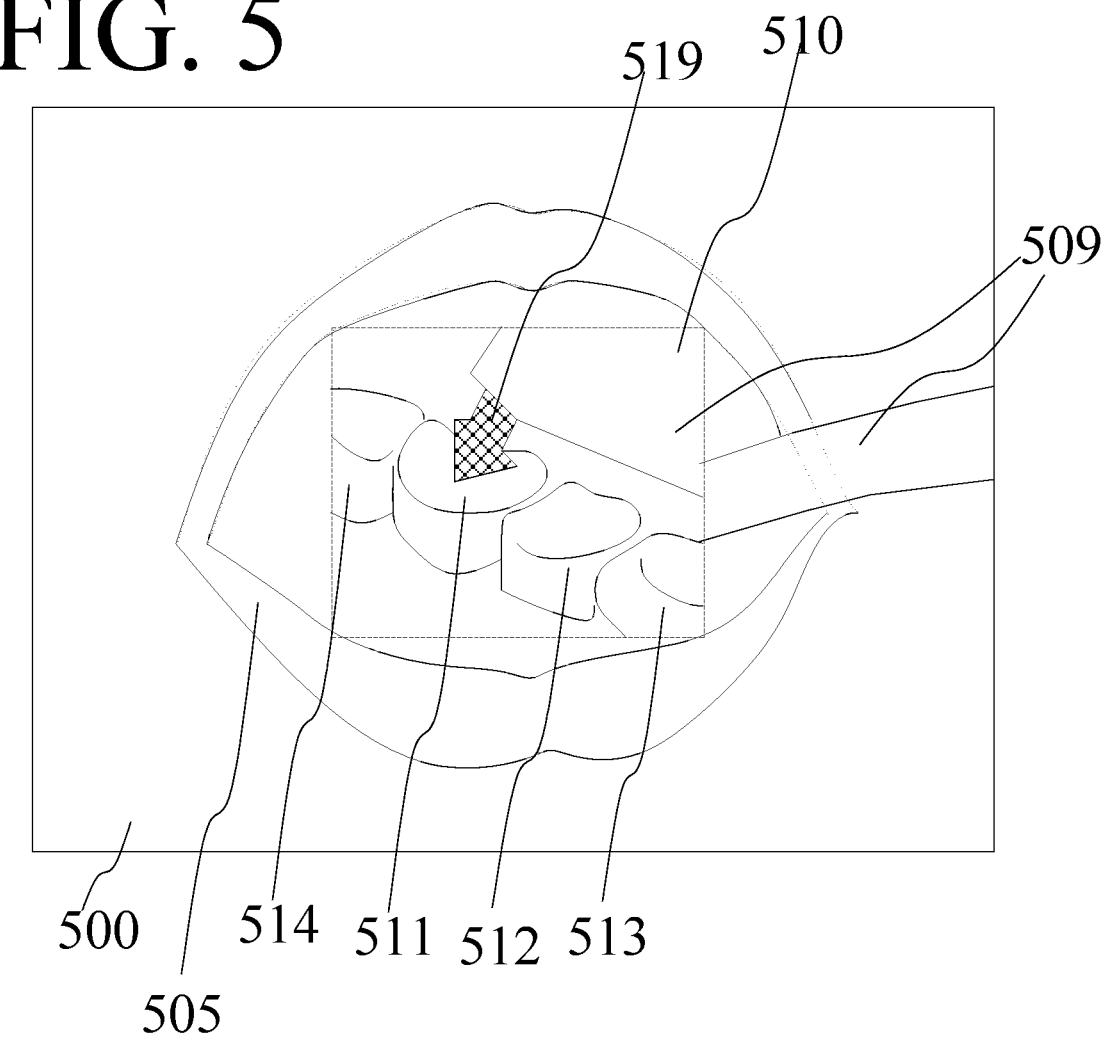
FIG. 5 shows an exemplary embodiment of the picture-in-picture feature of the eyewear.

Video image processing can also have a picture-in-picture function. As an illustration of this function, a relatively low magnification picture (500) can be displayed on the periphery of the screen, showing the surrounding features of the patient (505) and working environment, while a high magnification picture (510) of a dental drill (509) and a tooth (511) can be displayed near the center of the screen as enclosed by the dashed lines in FIG. 5. In this center picture (510), a dentist can see a magnified view of the teeth (511-514), and the tip of a dental drill (519) that is drilling a cavity on a tooth (511). Such a picture-in-picture option allows the user to maintain broad peripheral vision of his surroundings while simultaneously focusing on a specific working area with high magnification. Notes, previous pictures, x-rays, figures, tables, and other forms of data can also be displayed by the video display devices (SR, SL) while the user is in operation.

The user can display previous patient images on the screen and use video image processing to overlap and compare areas of interest. Overlapping infrared images with the camera views can detect abnormalities that are not visible with the bare eye. Video image processing can also overlap previously recorded three-dimensional radiology images, such as those from computed tomography scans, magnetic resonance imaging, ultrasounds, and other types of diagnostic imaging modalities, with current viewing images to help a doctor locate radiology findings in current views accurately. The eyewear also can support teleconferencing. Colleagues in remote areas can see what the operator sees, as if viewing through the operator's own eyes. At the same time, the operator can speak with colleagues who are watching through the cameras, through use of telecommunication. Videos can be recorded and saved for future reference as well. Audio signal processing can support active noise cancelling using the microphones (MR, ML) and the earphones (ER, EL).

While the preferred embodiments have been illustrated and described herein, other modifications and changes will be evident to those skilled in the art. It is to be understood that there are many other possible modifications and implementations so that the scope of the invention is not limited by the specific embodiments discussed herein. For example, in FIGS. 3(*a-c*) there are only two cameras (CR, CL) included in the illustrations, but three or more total cameras can also be used to improve accuracy of video signal processing. The cameras can be placed on or near the bottom of the eyewear, or the cameras can also be placed in a variety of other locations. For example, the cameras can be placed on or near the sides of the eyewear, or on or near the top of the eyewear. Light sources can be built into the cameras (CR, CL), or placed on many other different locations of the eyewear. For example, light sources may be placed immediately adjacent to the cameras or on the bridge of the frame. The size, shape and design of the eyewear may also vary to suit the user. The viewing windows (WR, WL, WV) of the eyewear may be completely clear, or may also contain filters to protect against eye-damaging wavelengths of light, such as those wavelengths emitted by light curing devices and lasers. Such filtering options may be turned on/off and controlled with an attached controller, with a remote control, with a contactless control device, or with an automated control system. Wavelength filters may be built into the viewing windows, or may also be separately attachable to the viewing windows. Different viewing windows with varying filtering properties may also be detachable and replaceable within the same eyewear.

FIG. 3(*d*) illustrates exemplary structures of an eyewear (242) that comprises the same components as the eyewear (222) in FIG. 3(*b*), but with an added light source (LC) that is attached to the center bridge (BR) of the eyewear (242), and with a pair of sight filters (FR, FL) that are located on or in front of the viewing windows (WR, WL).

FIG. 4(*c*) is a simplified symbolic block diagram for an exemplary optical controller of the eyewear (242) in FIG. 3(*d*). Each camera (CR, CL) on the eyewear (242) can feature a light source, light filter, and/or camera flash. A light source built into or placed near a camera can be aligned to provide proper illumination for the views captured by the camera. The light sources can additionally have light filters. For example, a light filter can make the light source illuminate with orange-colored or yellow-colored lighting. In dentistry, light filters are especially important, for reasons described in the following paragraph. As another practical example, light filters can also serve to filter out all wavelengths outside of the infrared (IR) range, thus allowing a camera to capture IR images. A camera flash is also useful for taking pictures, especially in areas with poor illumination. The center light source (LC) can also have a light filter and/or camera flash. The viewing direction (AC) of the center light source (LC) is adjustable. This light source viewing direction (AC) is adjusted to provide illumination of the working area. The sight filters (FR, FL) that are located in front of the viewing windows (WR, WL) or built into the viewing windows are used to protect the professional's eyes from harmful wavelengths of light. These optical components (CR, CL, LC, FR, FL) can be controlled manually or automatically. They can be controlled by a connected controller, by a remote control, by a contactless control device, or by an automated control system. A remote control can exist in many different forms, such as a foot pedal, bracelet, watch, or a ring on a finger. The optical components can also be controlled by an automated or event-driven controller. With an automated controller, certain events and/or conditions detected by the eyewear can trigger activation or deactivation of the optical components. As examples for automated control, camera flashes may be automatically activated when pictures are taken of areas with poor lighting, or sight filters (FR, FL) may be automatically activated when nearby harmful wavelengths of light are detected. With these examples, the camera flashes may also be automatically deactivated once the areas are shone with better lighting, and the sight filters may likewise be automatically deactivated when harmful wavelengths of light are no longer present. An automated controller can also cause the video display device(s) to provide the user with direct vision or with images captured by the camera(s), depending on the posture of the user or the views captured by the camera(s), as illustrated by the exemplary flow chart in FIG. 4(h). Direct vision is defined as the user's vision through the eyewear when the video display device(s) is/are not displaying images that are currently being captured by the camera(s). The user's direct vision through the eyewear can be clear, transparent, semi-transparent or minimally obstructed. The video display device(s) can stop displaying images captured by the camera(s) when the working area is not in complete view of the camera(s), thus allowing the user to see through the eyewear with direct vision. The video display device(s) can display the images captured by the camera(s) again when the working area is back in complete view of the camera(s), as shown in FIG. 4(h). For example, in dentistry the working area is typically the patient's mouth. In this example, if the user turns his/her head away so that the camera(s) cannot capture the entire mouth of the patient, the video display device(s) can turn off so that the user can see through the eyewear with direct vision. When the user moves his/her head back into position so that the camera(s) can capture the entire mouth again, the video display device(s) can turn back on to display the images captured by the camera(s). The video display device(s) can also provide the user with direct vision when the eyewear viewing direction does not approximate the horizontal plane, or with images captured by the camera(s) when the eyewear viewing direction does approximate the horizontal plane, as shown in FIG. 4(h). For example, when a dentist tilts his/her head significantly downward or upward, the video display device(s) can be turned off to provide direct vision through the viewing windows of the eyewear. When the dentist tilts his/her head back into position so that the eyewear viewing direction approximates the horizontal plane again, the video display device(s) can turn back on to provide the images captured by the camera(s). Additionally, the video display device(s) can provide the user with direct vision through the eyewear when the user does not sit or stand with ergonomically healthy posture, or with images captured by the camera when the user does sit or stand with ergonomically healthy posture, as shown in FIG. 4(h). For example, when a dentist bends his/her neck or back too far forward, the video display device(s) can be turned off to provide direct vision. When the dentist returns his/her body into ergonomically healthy sitting or standing posture, the video display device(s) can be turned back on to provide the camera views again. The exemplary flow chart in FIG. 4(h) indicates that the video display device(s) project the images captured by the camera(s) when the working area is in complete view of the camera(s), when the eyewear viewing direction approximates the horizontal plane, and when the user is in ergonomically healthy posture. However, it is also possible for the video display device(s) to display the camera views when only one of these three criteria have been met, when two of these three criteria have been met, or when other criteria have been met. For example, the camera views can still be displayed by the video display device(s) even when the working area is not in complete view of the camera(s), and the eyewear viewing direction approximates the horizontal plane and/or the user is in ergonomically healthy posture.

The lighting emitted by the eyewear can be turned on/off, changed into different levels of brightness, filtered, or changed into other modes. In dentistry, filtering is especially important because when normal lighting is shone on tooth-colored filling materials, the filling often hardens prematurely while the dentist is still trying to pack the filling into the tooth. For this reason, normal lighting is often altered using a filter placed over the light source when the dentist is working with light-polymerized dental materials. Such filters eliminate the wavelengths of light which cause premature hardening of the filling material. It is therefore important that the lighting emanating from the eyewear in this application can be adjusted quickly and easily by the dentist, depending on the situation. For example, a dentist may want to work with normal bright lighting while drilling on a tooth, but then switch to a filtered lighting mode when adding a filling material to the tooth.

Proper eye protection is also very important in the healthcare field. In dentistry, harmful wavelengths of light are used on a daily basis. When viewed directly with the eyes, dental curing lights that are used to polymerize certain filling materials are damaging to the dentist's eyes. These lights typically emit wavelengths within the 400-500 nm range. One present solution to this problem is to place an orange filtering shield around the source of the curing light to reduce the amount of damaging light being exposed to the eyes. However, this shield is bulky and often does not fully protect the user's eyes. Another present solution applied by most dentists is to look away from the light, after the light has been positioned next to the patient's tooth and switched on. However, when the dentist is not looking at the position of the light, it is very easy for the dentist's hand and curing light to drift away from the tooth. This may lead to inadequate polymerization of the filling. With the eyewear in this application, the cameras can point directly toward the curing light, thus allowing the dentist to look at the area being cured with the video display devices (SR, SL) instead of with his/her own eyes. Sight filters (FR, FL) also can be activated for further protection against dental curing lights. This allows for both eye protection and operating precision.

Modern-day dentistry also involves laser usage of various wavelengths. These wavelengths typically range from 450 nm to 10,600 nm, depending on the procedure being performed. These lasers require the dentist, patient, and adjacent staff members to wear wavelength-specific protective eyewear when in use. The eyewear of this patent application can have viewing windows (WR, WL) with various wavelength filtering options (FR, FL) that can be controlled manually, by an attached controller, by a remote control, by a contactless control device, or by an automated control system, to provide adequate protection while using a variety of lasers. For example, the user can specify that he/she wants all wavelengths between 450-655 nm filtered out of the viewing windows, or all wavelengths over 9300 nm to be filtered out. The users may also detach and switch out the viewing windows of the eyewear with wavelength-specific protective viewing windows of their choosing. Another option is to add external filters over the viewing windows.

While the preferred embodiments have been illustrated and described herein, other modifications and changes will be evident to those skilled in the art. It is to be understood that there are many other possible modifications and implementations so that the scope of the invention is not limited by the specific embodiments discussed herein. For example, when the video display device(s) stop displaying the images captured by the camera, the user's subsequent vision through the eyewear does not have to be completely clear or transparent. In a scenario where there are nearby harmful wavelengths of light when the display device(s) stop displaying the camera images, the sight filters can still work to filter out harmful wavelengths of light. In this case, the user would still have see-through vision through the eyewear, though with a filtered appearance that may be different from a completely clear or transparent viewing window. For instance, if the video display device(s) stopped displaying the camera images while the filters are blocking out the wavelengths from an active dental curing light, the user can have see-through vision through an orange pair of viewing windows.

Figure 3D:
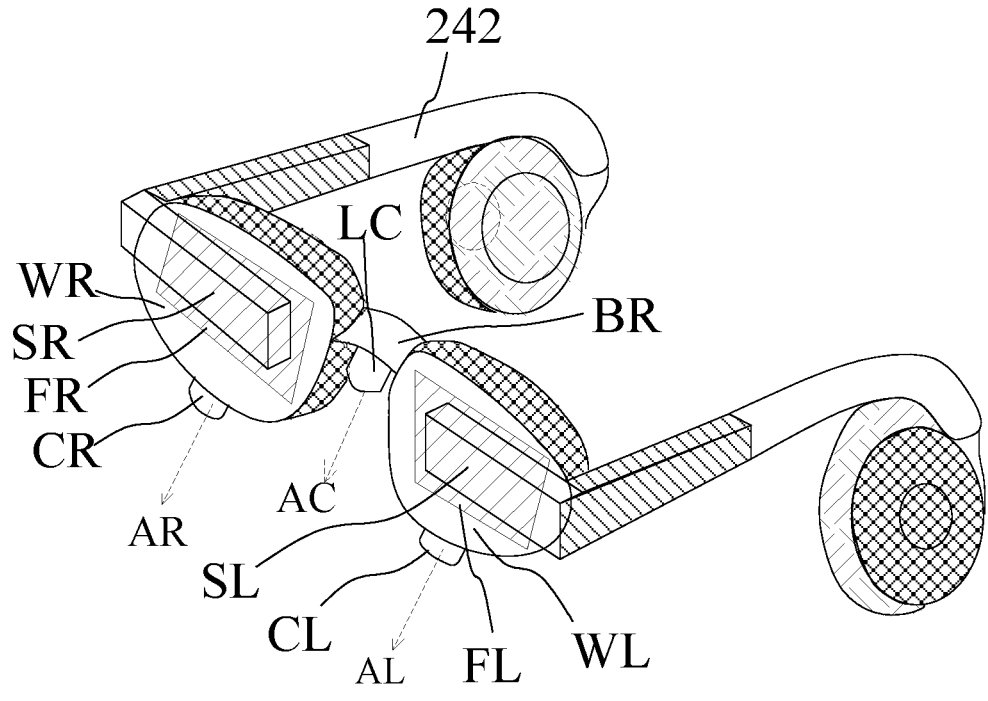
FIG. 3(d) illustrates exemplary structures of an eyewear (242) of this patent application that has an additional light source (LC) and protective sight filters (FR, FL)
Figure 3E:
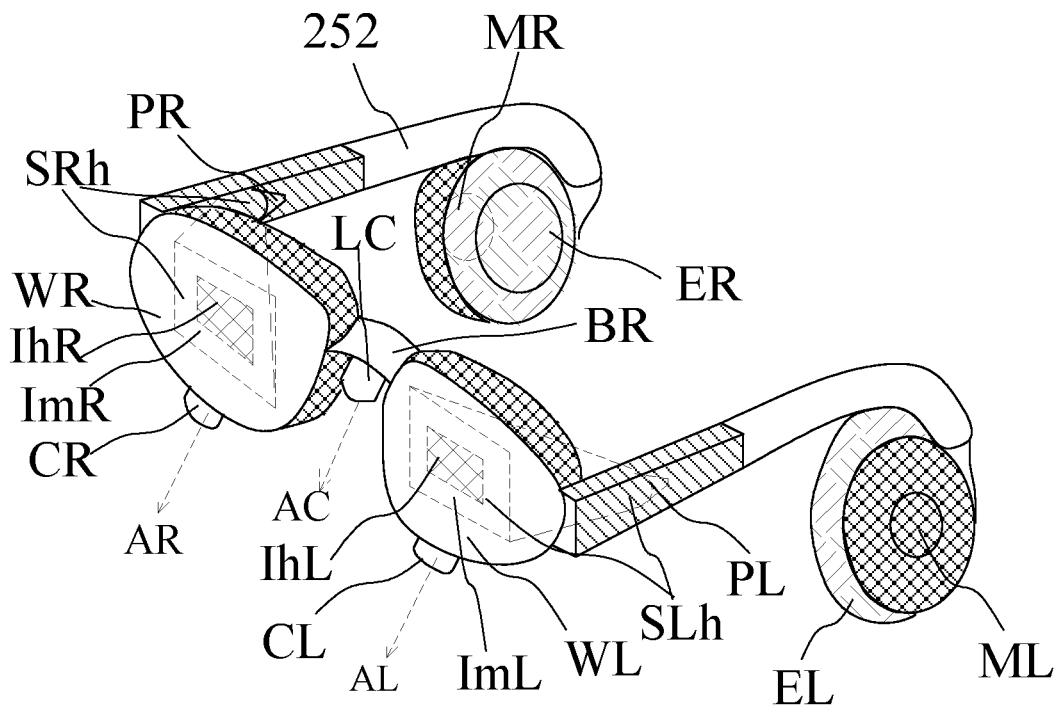
FIGS. 3(e-f) illustrate exemplary eyewear (252, 262) of this patent application.
FIG. 3(g) illustrates exemplary structures of an eyewear (360) of this patent application featuring a face shield (361), two cameras (CRd, CLd), and two video display devices (SRd, SLd)
FIG. 3(h) is a symbolic cross-section diagram for the left-eye-side camera (CLd) of the eyewear (360) in FIG. 3(g)
FIG. 3(i) is a symbolic diagram for a side view of the eyewear (360) in FIG. 3(g)
FIG. 3(j) illustrates exemplary structures of a headwear (370) of this patent application that places cameras (CR1, CL1) on or near a microphone (Mic) of a headset.

FIG. 3(e) illustrates exemplary structures of an eyewear (252) that comprises the same components as the eyewear (242) in FIG. 3(d), but with different video display devices. A right-eye-side video projector (PR) projects a right-eye-side video image (ImR) on the right viewing window (WR) of the eyewear (252). This right-eye-side video projector (PR) and the right-eye-side video image (ImR) on the right viewing window (WR) form the right-eye video display device (SRh) of this eyewear (252). A left-eye-side video projector (PL) projects a left-eye-side video image (ImL) on the left viewing window (WL) of the eyewear (252). This left-eye-side video projector (PL) and the left-eye-side video image (ImL) on the left viewing window (WL) form the left-eye video display device (SLh) of this eyewear (252). These video display devices (SRh, SLh) display the video images viewed by the user, where the video images formed by the video display devices and viewed by the user are at or near a horizontal orientation in front of the user, so that the user is able to view objects or patients located below eye level with the video display devices, while working with ergonomically healthy sitting or standing posture and with minimal to no straining of the eyes. The right-eye-side video image (ImR) and the left-eye-side video image (ImL) of the eyewear can have uniform optical resolution, or they can also have a plurality of regions of different optical resolution. In this example, the center region (IhR) of the right-eye-side video image (ImR) has higher resolution than the rest of the image. Similarly, the center region (IhL) of the left-eye-side video image (ImL) can also have higher resolution than the rest of the image. Optical resolution is typically measured by the density of picture elements in the displayed image. Video display devices typically comprise light emitting device arrays that display video images using devices such as light emitting diodes (LED's), organic light emitting diodes (OLED's), or liquid crystal displays (LCD's). The video images displayed by light emitting device arrays may need to be redirected to form the images viewed in front of the users' eyes. Examples of image redirection devices include lenses, light reflectors, projectors, screens, wave guides, and OLED devices.

Figure 3F:
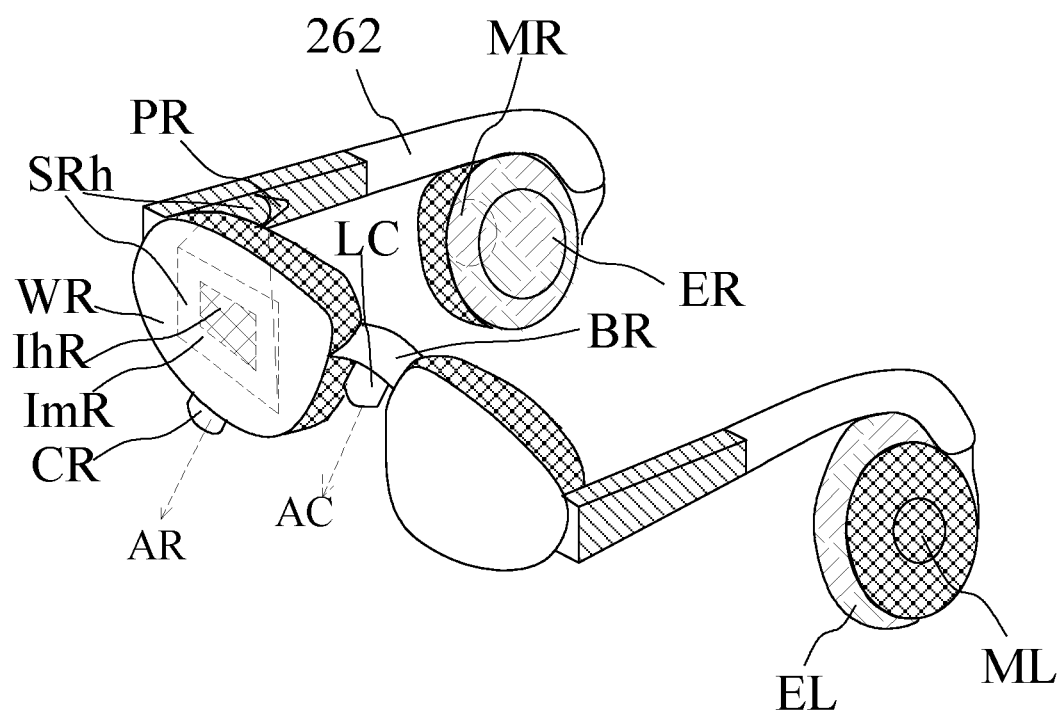

FIG. 3(f) illustrates exemplary structures of an eyewear (262) that comprises the same components as the eyewear (252) in FIG. 3(e), but without the left-eye-side components (SLh, PL, ImL, CL). This eyewear (262) can be manufactured at lower costs than the eyewear (252) in FIG. 3(e), but its video image is two dimensional instead of three dimensional due to the lack of a second camera.

Figure 3G:
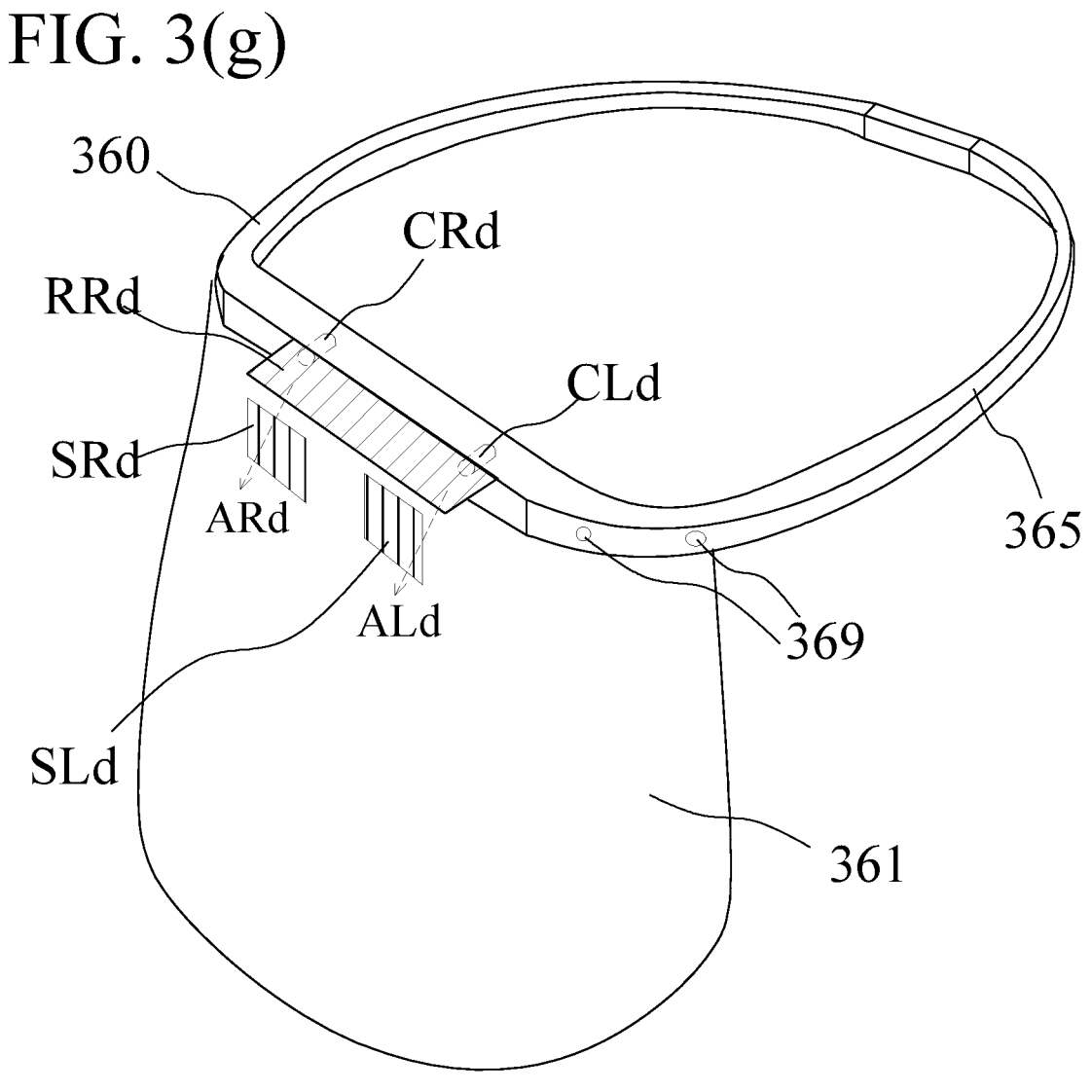
Figures 3H, 3I:
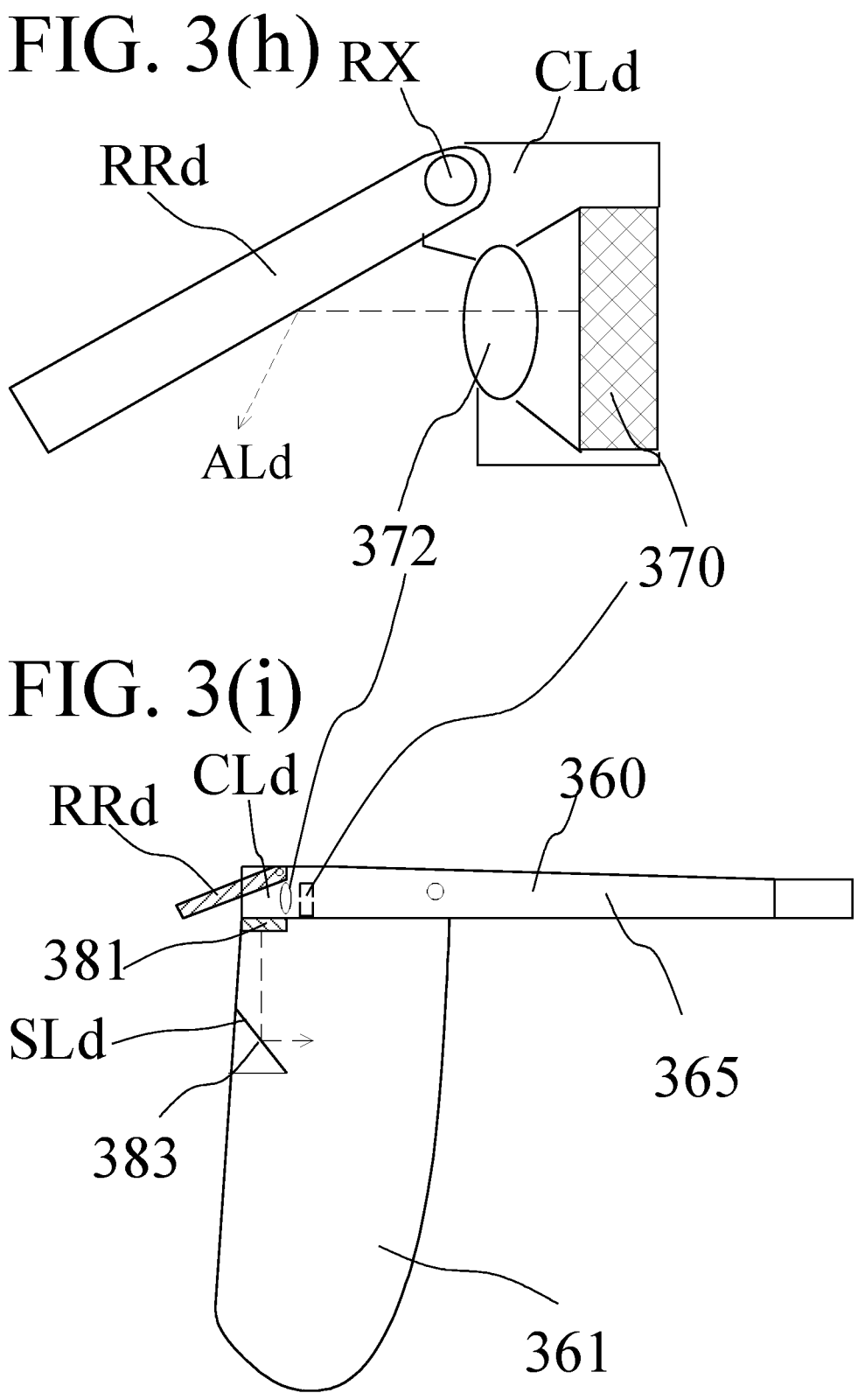
Figure 3J:
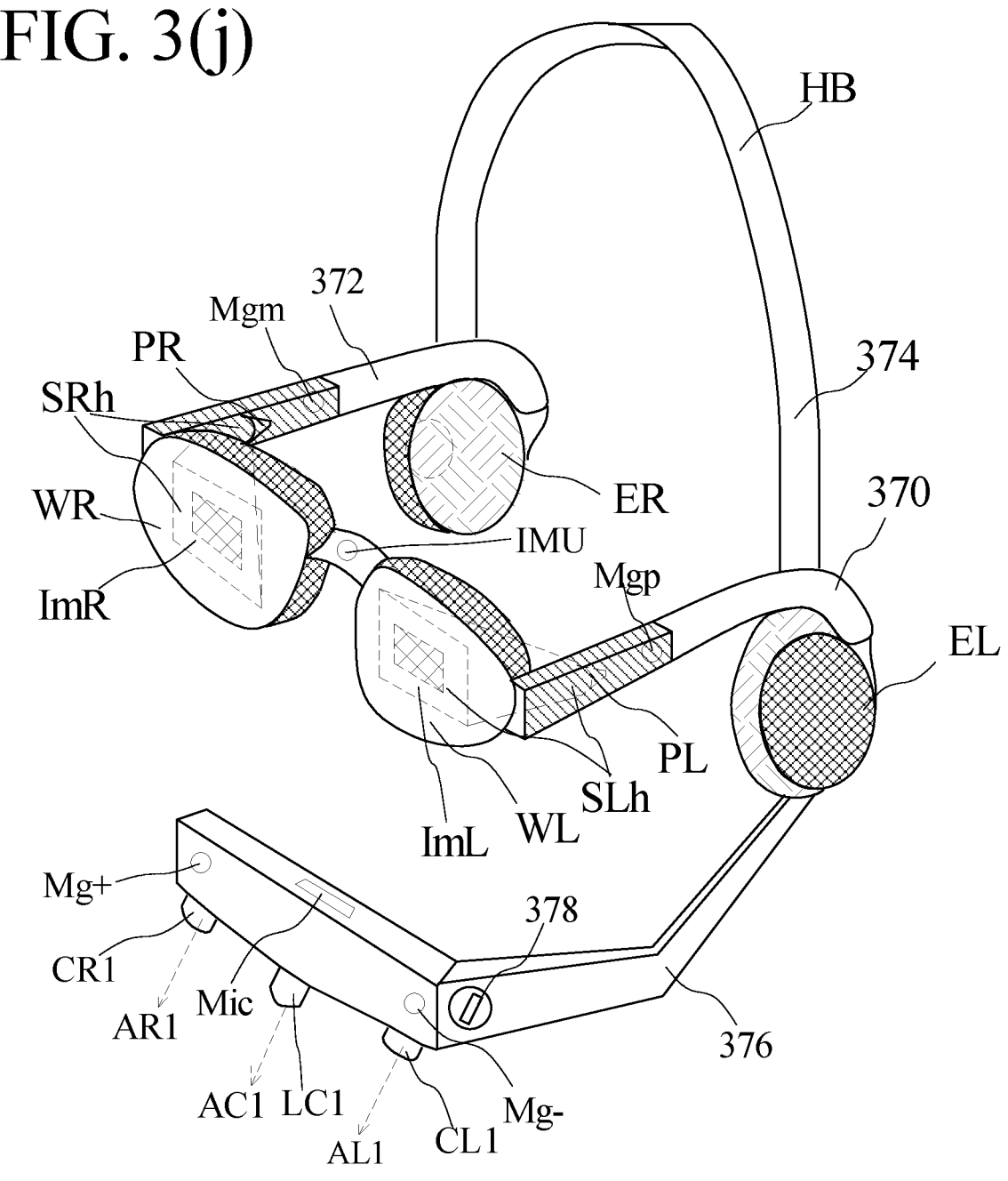
Figure 4D:
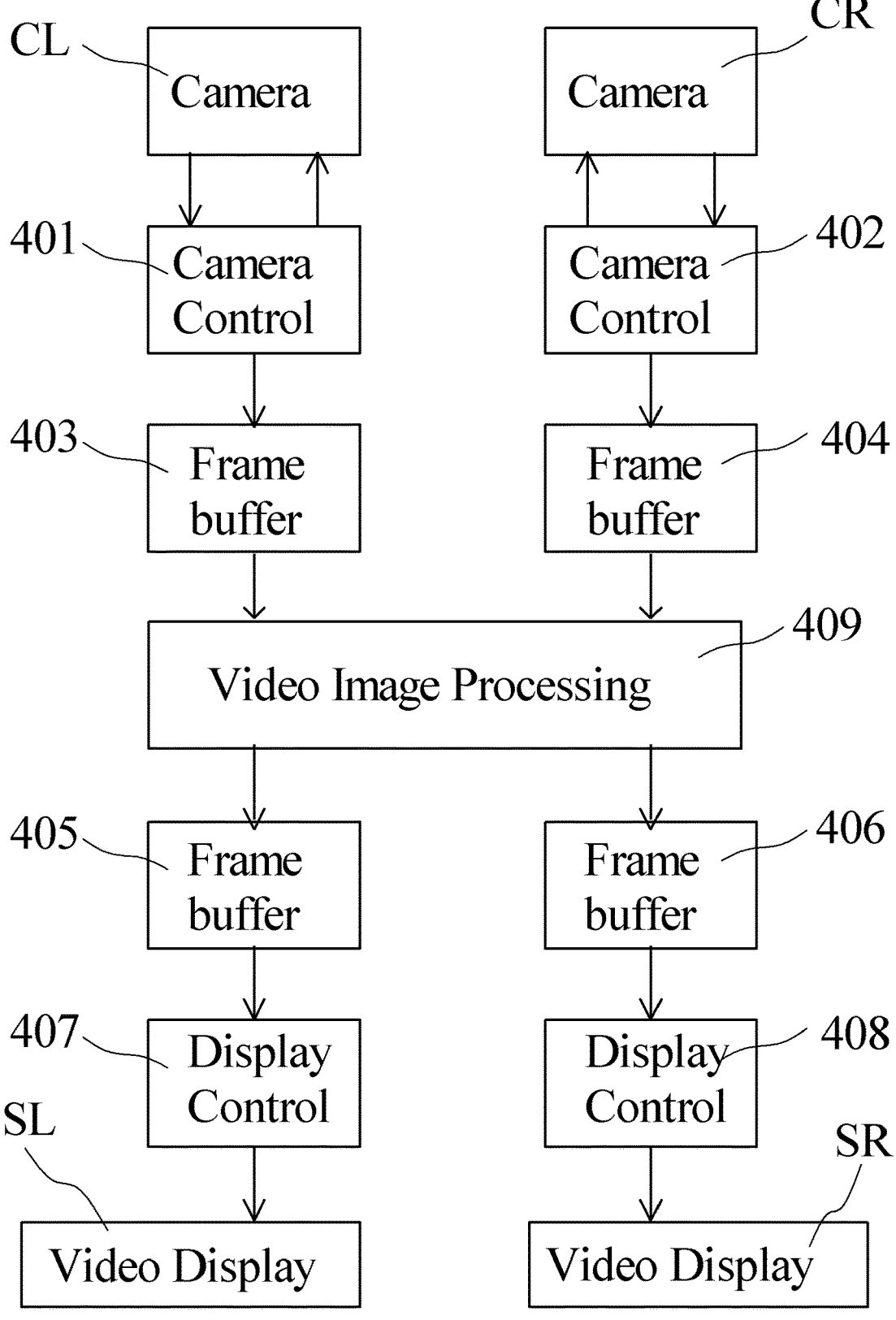
FIG. 4(b) is a simplified flow chart illustrating exemplary video image processing procedures for one embodiment of this patent application.
FIGS. 4(d-g, i) are simplified symbolic block diagrams for exemplary optical controllers for the eyewear of the present invention.
FIG. 4(h) is an exemplary flow chart illustrating the control logic of a controller that can automatically change the video image(s) of the video display device(s) depending on the views captured by the camera(s) or the posture of the user.

FIG. 4(d) is a simplified symbolic block diagram illustrating exemplary structures of the video control system for the eyewear (202, 222, 232, 242, 252, 262, 360) in FIGS. 3(a-g). In this example, one camera control unit (401) reads data from the left-eye-side camera (CL) and stores the data into a frame buffer (403), while a different camera control unit (402) reads data from the right-eye-side camera (CR) and stores the data into another frame buffer (404). A video image processing unit (409) analyzes the data stored in the frame buffers (403, 404), performs the functions discussed in FIG. 4(b, c), and stores data into another set of frame buffers (405, 406) for image display. In this example, one display control unit (407) reads data from one frame buffer (405) and displays the image with the left-eye video display device (SL), while a different display control unit (408) reads data from another frame buffer (406) and displays the image with the right-eye video display device (SR).

For a typical camera capture rate of 60 frames per second, it takes about 16.7 milliseconds for a camera to capture one full frame of video data. The example in FIG. 4(d) requires two frame buffer operations, while video image processing typically takes one frame time. Therefore, The Image Processing Delay Time (IPDT) of the system in FIG. 4(d) can be 50 milliseconds or more, where IPDT is defined as the shortest time difference between the time when a change of view is captured by a camera of the eyewear and the time when this corresponding change of view is displayed by a display device of the eyewear. Long IPDT can cause problems for operations that require timely responses.

For the example in FIG. 4(d), the left-eye-side camera (CL) and the right-eye-side camera (CR) are controlled by different camera control units (401, 402), so that right and left camera operations are not synchronized. When one camera starts to capture a new frame of image, the other camera may already be in the process of capturing a separate frame of image. This timing mismatch can cause problems for high precision operations. In this case, the Camera Timing Mismatch (CTM), which is defined as the time difference between the time when the right-eye-side camera starts to capture a new frame of image and the time when the left-eye-side camera starts to capture a new frame of image, can be as long as half the time it takes to capture a single frame of image. For a typical camera capture rate of 60 frames per second, the CTM of the system can be approximately 8.3 milliseconds.

For the example in FIG. 4(d), the left-eye video display device (SL) and the right-eye video display device (SR) are controlled by different display control units (407, 408) so that right and left video display operations are not synchronized. When one video display device starts to display a new frame of image, the other video display device may already be in the process of displaying a separate frame of image. This timing mismatch can cause problems for high precision operations. In this case, the Display Timing Mismatch (DTM), which is defined as the time difference between the time when the right-eye video display device (SR) starts to display a new frame of image and the time when the left-eye video display device (SL) starts to display a new frame of image, can be as long as half the time it takes to display a single frame of image. For a typical camera capture rate of 60 frames per second, the DTM of the system in FIG. 4(d) can be approximately 8.3 milliseconds.

Figure 4E:
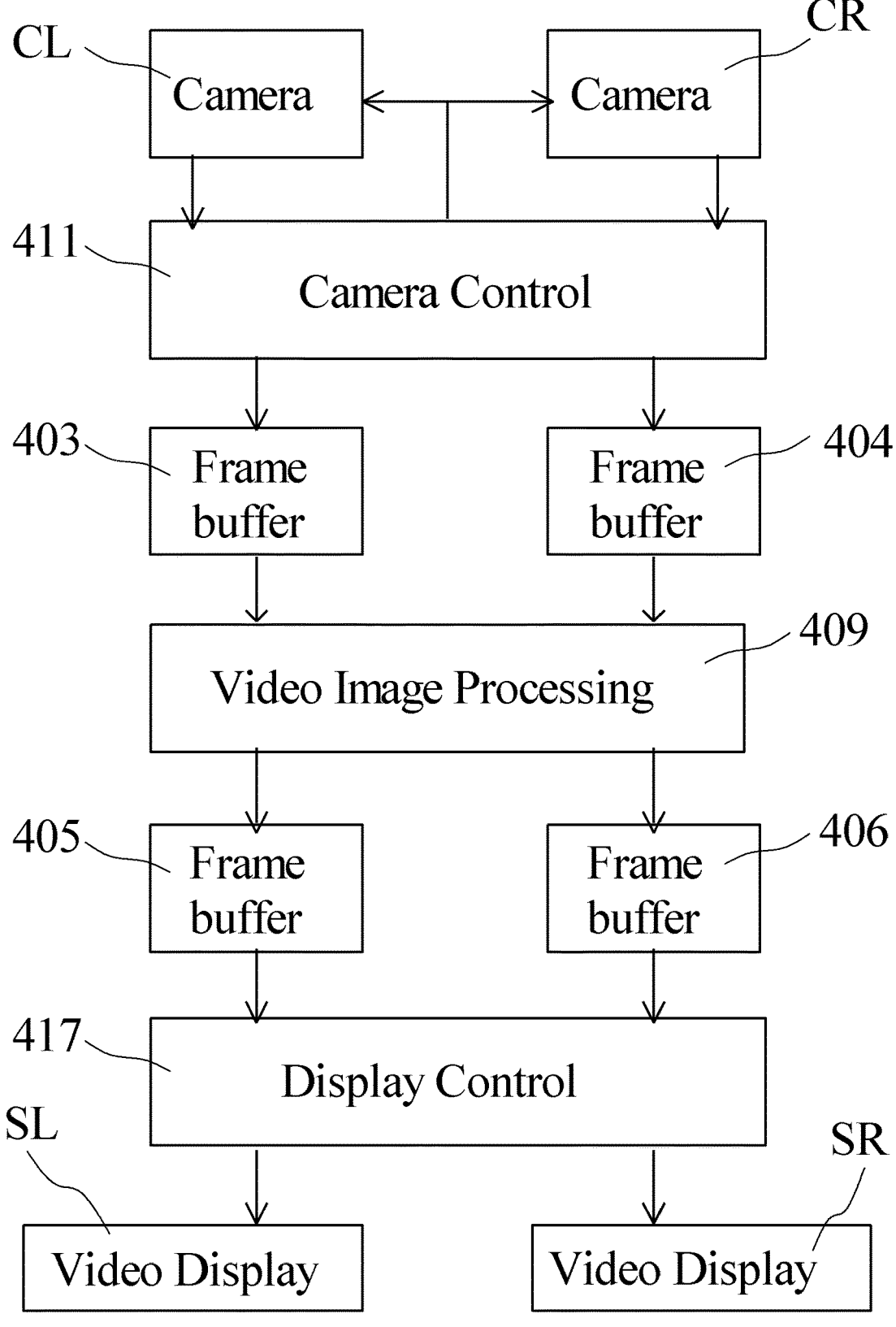

FIG. 4(e) is a simplified symbolic block diagram illustrating another exemplary structure of the video control system for the eyewear (202, 222, 232, 242, 252, 262, 360) in FIGS. 3(a-g). In this example, a camera control unit (411) reads data from the left-eye-side camera (CL) and stores the data into a frame buffer (403), while the same camera control unit (411) also reads data from the right-eye-side camera (CR) and stores the data into another frame buffer (404). A video image processing unit (409) analyzes the data stored in the frame buffers (403, 404), performs functions discussed in FIG. 4(b, c), and stores data into another set of frame buffers (405, 406) for image display. In this example, one display control unit (417) reads data from one frame buffer (405) and displays the image with the left-eye video display device (SL), while the same display control unit (417) also reads data from another frame buffer (406) and displays the image with the right-eye video display device (SR).

For the example in FIG. 4(e), the left-eye-side camera (CL) and the right-eye-side camera (CR) are controlled by the same camera control unit (411) so that camera operations can be synchronized. When one camera starts to capture a new frame of image, the other camera can also start to capture a new frame of image at approximately the same time. In this case, the Camera Timing Mismatch (CTM) is determined by timing accuracy of the camera control unit (411). Typically, the CTM of the system is less than 5 milliseconds, but a CTM under 1 millisecond can also be achieved. Using integrated circuit technology, a CTM of nanoseconds can be achieved.

For the example in FIG. 4(e), the left-eye video display device (SL) and the right-eye video display device (SR) are controlled by the same display control unit (417) so that video display operations can be synchronized. When one video display device starts to display a new frame of image, the other video display device can also start to display a new frame of image at approximately the same time. In this case, the Display Timing Mismatch (DTM) is determined by timing accuracy of the display control unit (417). Typically, the DTM of the system is less than 5 milliseconds, but a DTM under 1 millisecond can also be achieved. Using integrated circuit technology, a DTM of nanoseconds can be achieved.

The example in FIG. 4(e) still requires two frame buffer operations, while video image processing typically takes one frame time. Therefore, the Image Processing Delay Time (IPDT) of the system in FIG. 4(e) can still be 50 milliseconds or more.

Figure 4F:
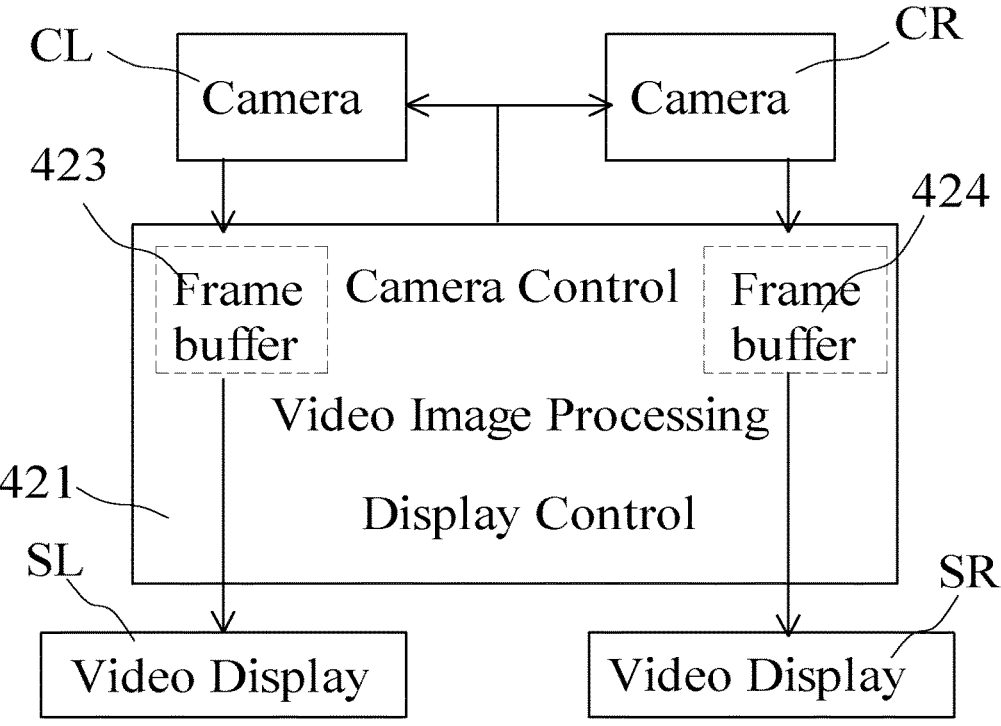

FIG. 4(f) is a simplified symbolic block diagram illustrating another exemplary structure of the video control system for the eyewear (202, 222, 232, 242, 252, 262, 360) in FIGS. 3(a-g). In this example, the camera control unit, video image processing unit, display control unit, and frame buffers (423, 424) are all merged into one video control unit (421), which can be implemented as one integrated circuit. This video control unit (421) reads data from the left-eye-side camera (CL) and stores the data into an internal frame buffer (423), while the same video control unit (421) also reads data from the right-eye-side camera (CR) and stores the data into another internal frame buffer (424). Video image processing circuits inside of the video control unit (421) analyze the data stored in the internal frame buffers (423, 424), and perform functions discussed in FIG. 4(b, c). Display control circuits inside of the video control unit (421) read data from the same internal frame buffers (423, 424) and display images with the left-eye video display device (SL) and the right-eye video display device (SR).

For the example in FIG. 4(f), camera operations and display operations can be synchronized. CTM or DTM of the system can be less than 5 milliseconds, while CTM or DTM values under 1 millisecond can also be achieved. The example in FIG. 4(f) requires one frame buffer storage, and therefore, the Image Processing Delay Time (IPDT) of the system in FIG. 4(f) can be under 20 milliseconds.

Figure 4G:
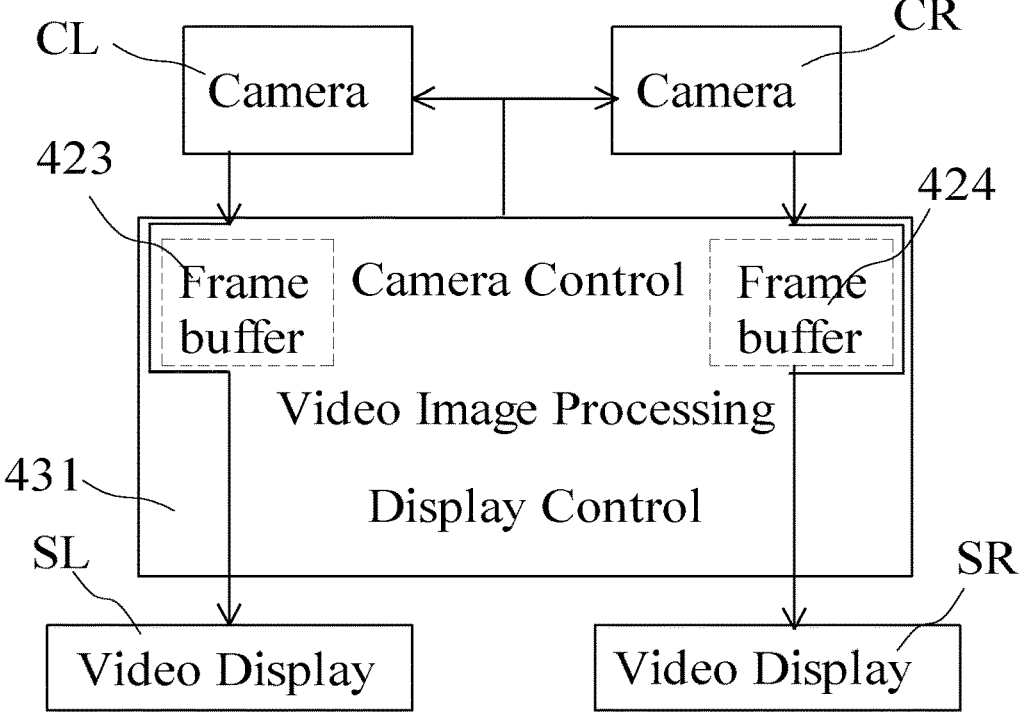
Figure 4H:
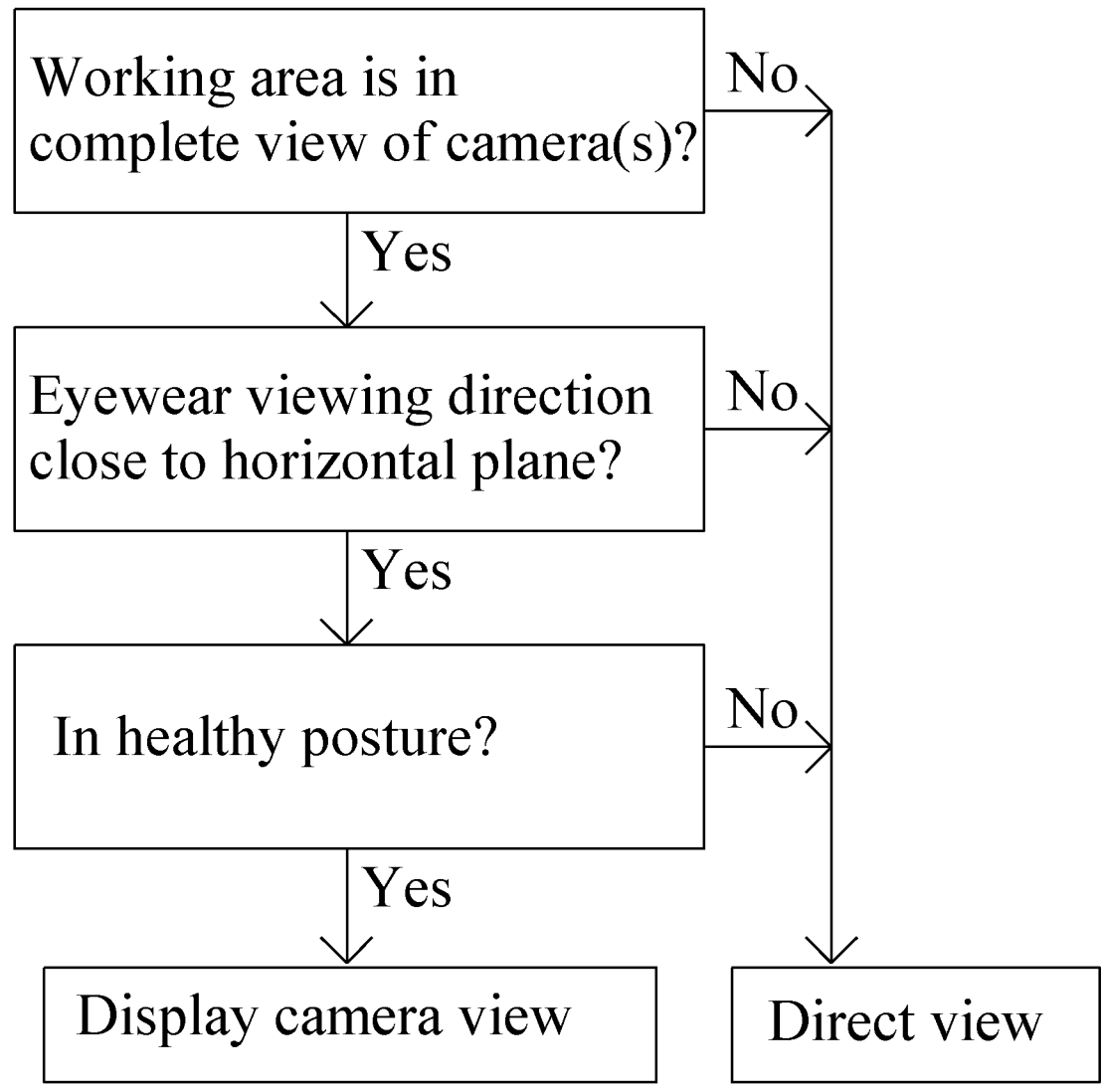
Figure 4I:
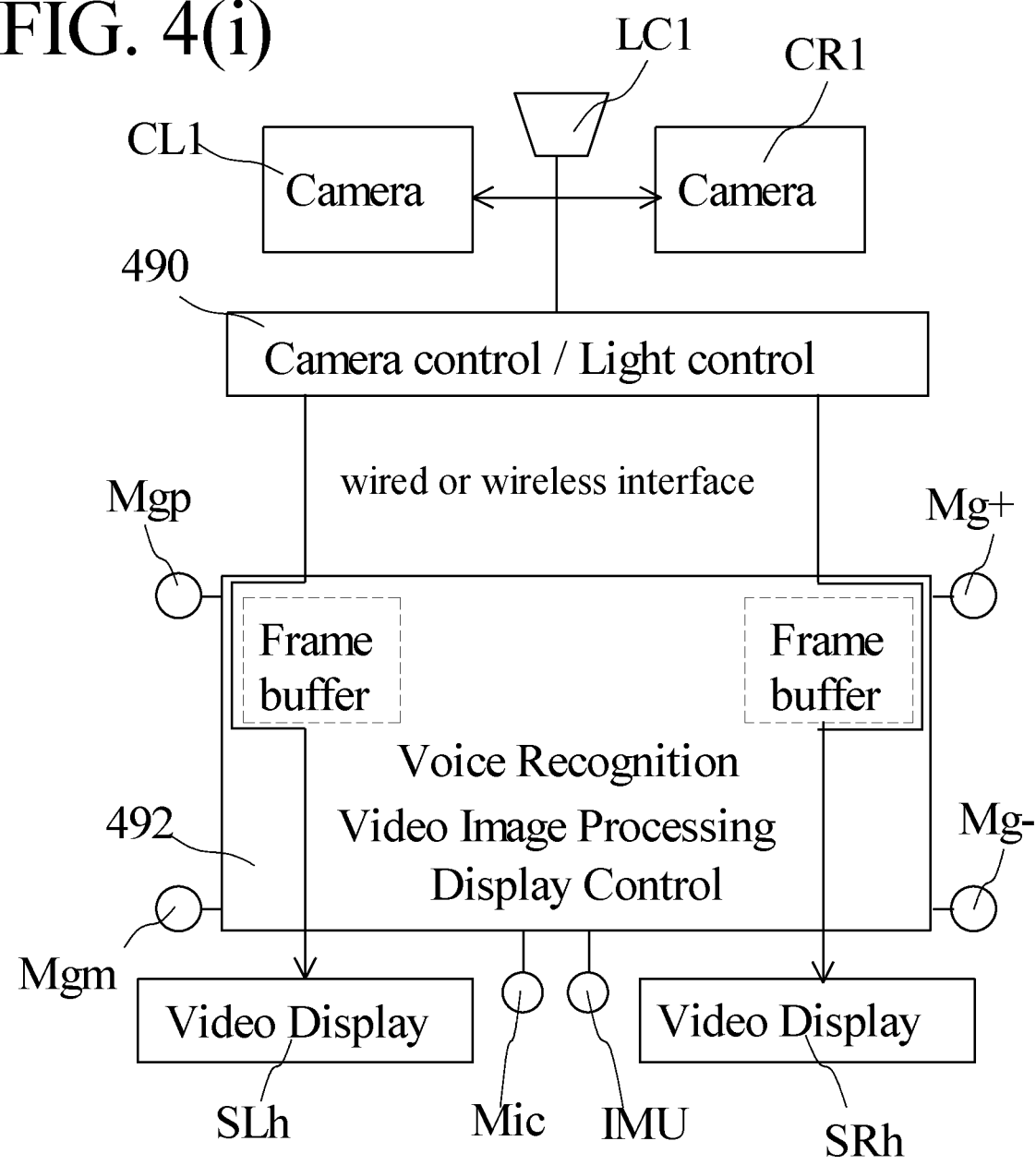

FIG. 4(g) is a simplified symbolic block diagram illustrating another exemplary structure of the video control system for the eyewear (202, 222, 232, 242, 252, 262, 360) in FIGS. 3(a-g). This example is similar to the example in FIG. 4(f) except that the video data read from cameras (CL, CR) can bypass the frame buffers (423, 424) to be displayed by the video display devices (SL, SR). The Image Processing Delay Time (IPDT) of the system in FIG. 4(g) is therefore no longer limited by frame rate. IPDT under 10 milliseconds, 5 milliseconds, or one millisecond are achievable.

While the preferred embodiments have been illustrated and described herein, other modifications and changes will be evident to those skilled in the art. It is to be understood that there are many other possible modifications and implementations so that the scope of the invention is not limited by the specific embodiments discussed herein. For example, FIG. 3(g) shows simplified exemplary structures for an eyewear (360) of the present invention that is designed for the needs introduced by the coronavirus pandemic. As shown in FIG. 3(g), this eyewear (360) comprises a face shield (361) that is connected to a headband (365). The headband (365) can be made in many different forms, such as a visor, helmet, or head strap. The headband can also be made from many different types of materials such as plastic, metal, elastic bands, and/or foam. In this example, the face shield (361) is connected to the headband (365) by pegs (369), so that part or all of the face shield (361) can be attached to the eyewear (360) or detached from the eyewear for cleaning or replacement. The face shield (361) also can be connected to the eyewear by many other materials or methods, such as knobs, clips, slots, buckles, and/or adhesives. A right-eye-side camera (CRd) and a left-eye-side camera (CLd) are attached to the face shield (361) or to the headband (365), as shown in FIG. 3(g). Users have the option to detach these cameras (CRd, CLd) from the eyewear. A right-eye video display device (SRd) is placed on the face shield (361) or on the headband (365), and a left-eye video display device (SLd) is placed on the face shield (361) or on the headband (365). The video images displayed by the right-eye video display device (SRd) and the left-eye video display device (SLd) are located at or near a horizontal orientation in front of the user, so that the user is able to view objects or patients located below eye level on the video images, while working with ergonomically healthy sitting or standing posture and with minimal to no straining of the eyes. The video image formed by the right-eye video display device (SRd) and the video image formed by the left-eye video display device (SLd) allow the users to see their preferred working three-dimensional views with natural and realistic depth perception, while maintaining ergonomically healthy posture. Users have the option to detach part or all of these video display devices (SRd, SLd), turn them off, or move them out of sight. It is desirable to make the video display devices (SR, SL) using materials that are transparent or partially transparent while not in use. This allows for normal everyday vision through the eyewear with the video display devices (SRd, SLd) placed in front of the user, when the electronic functions of the eyewear have been switched off. Part(s) of the face shield (361) can also be used by the video display devices (SRd, SLd) to display video images. For example, a portion of the face shield may be used as a screen, wave guide, or light reflector. The distance between the cameras (CRd, CLd) can be adjusted to be about the same as the distance between the pupils of the user, or the interpupillary distance of the user. The distance between the cameras (CRd, CLd) can also be wider or narrower than the interpupillary distance of the user. These cameras (CRd, CLd) can also be placed in a wide variety of locations on the face shield or headband. For example, the cameras (CRd, CLd) can be placed on or near the bottom edge of the face shield, on or near the left and right edges of the face shield, on the upper right and upper left corners of the face shield, or on the headband near the two temples of the user. The viewing direction (ARd) of the right-eye-side camera (CRd) and the viewing direction (ALd) of the left-eye-side camera (CLd) are typically adjusted to have the same or approximately the same angle while focusing on a targeted working area. The declination angles of the cameras (CRd, CLd) are adjustable to be 45 degrees or larger, wherein declination angle is defined as the angle between the eyewear viewing direction and the viewing direction of the camera, where the declination angle of the camera is adjusted to approximate the WDA of the user.

FIG. 3(h) is a simplified exemplary cross-section diagram illustrating the structures of the left-eye-side camera (CLd) of the eyewear (360) shown in FIG. 3(g). In this example, the camera (CLd) comprises a light sensor array (370), a lens (372), and a light reflector (RRd). The light sensor array (370) captures optical images by an array of light sensors such as charge coupled devices (CCD). The lens (372) magnifies the video image captured by the camera. The orientation of the light reflector (RRd) determines the viewing direction (ALd) of the camera (CLd). The declination angle of the camera (CLd) can be adjusted by rotating this light reflector (RRd) against an axis of rotation (RX), as shown in FIG. 3(h). In this example, the viewing direction (ALd) of the camera (CLd) is not the same as the viewing direction of its light sensor array (370). These cameras with a light sensor array (370), lens (372), and light reflector (RRd) can also be used for the eyewear in the previous examples in FIGS. 3(a-f). In the example of FIG. 3(g) the right-eye-side camera (CRd) has similar structures to the left-eye-side camera (CLd), and the light reflector (RRd) of the right-eye-side camera (CRd) also serves as the light reflector of the left-eye-side camera (CLd). With this setup, adjusting one light reflector (RRd) can adjust the viewing directions (ARd, ALd) of both cameras (CRd, CLd) simultaneously. The declination angles of both cameras (CRd, CLd) are typically adjusted to approximate the WDA of the users at angles of 45 degrees or larger. This light reflector (RRd) can be attached to the face shield (361) or to the headband (365), and can also exist as part of the face shield (361) or headband (365). The light reflector can also exist as two separate light reflectors, one for the right-eye-side camera (CRd) and one for the left-eye-side camera (CLd).

FIG. 3(i) is a simplified exemplary diagram illustrating the side view of the eyewear (360) shown in FIG. 3(g). In this example, the left-eye-side video display device (SLd) of the eyewear (360) comprises a light emitting device array (381) and a half-mirror (383), as shown in FIG. 3(i). The light emitting device array (381) displays video images using devices such as light emitting diodes (LED's), organic light emitting diodes (OLED's), or liquid crystal displays (LCD's). In this example, a half-mirror (383) that is connected to the face shield (361) reflects the pictures displayed by the light emitting device array (381) into the left eye of the user, as illustrated in FIG. 3(i). The right-eye-side video display device (SRd) can have the same or similar structures. In this example, part of the face shield (361) is used as part of the video display devices (SLd, SRd). Other types of video display devices can also utilize the face shield (361). For example, the face shield (361) can be used as a wave guide that brings video images to the user. It is also possible to print OLED devices directly onto the face shield (361), or use part of the face shield (361) as the screen for a projector. The face shield can also be used to protect the user from harmful wavelengths of light, such as those wavelengths from dental curing lights, lasers, UV lights, and infrared light. This protection can come from attachable/detachable sight filters, or sight filters that are built-in to become part of the face shield itself.

While the preferred embodiments have been illustrated and described herein, other modifications and changes will be evident to those skilled in the art. It is to be understood that there are many other possible modifications and implementations so that the scope of the invention is not limited by the specific embodiments discussed herein. For instance, in previous examples, the cameras used to view the working areas are placed on the eyewear; however, the cameras do not need to be placed on the eyewear, and can instead be placed on other nearby items or locations. The cameras do not need to be attached to the eyewear, and can instead be placed on a microphone, light, headset, piece of clothing, furniture, equipment, fixture, wall, window, floor, ceiling, counter, door, or other nearby attachment.

FIG. 3(j) illustrates exemplary structures of an electronic device (370) that has similar structures to the eyewear (252) in FIG. 3(e). This electronic device (370) also comprises an eyewear (372) with video displays (SRh, SLh) and cameras (CR1, CL1) that are pointing downward to a working area. The major difference here is that the cameras (CR1, CL1) are not placed on the eyewear (372) of the electronic device (370). The eyewear (372) is capable of viewing objects or patients in a working area below eye level at a Working Declination Angle (WDA) of 45 degrees or larger. In this example, the eyewear (372) has a right-eye-side video projector (PR) that projects a right-eye-side video image (ImR) on the right viewing window (WR) of the eyewear (372). This right-eye-side video projector (PR) and the right-eye-side video image (ImR) on the right viewing window (WR) form the right-eye video display device (SRh)

of the eyewear (372). A left-eye-side video projector (PL) projects a left-eye-side video image (ImL) on the left viewing window (WL) of the eyewear (372). This left-eye-side video projector (PL) and the left-eye-side video image (ImL) on the left viewing window (WL) form the left-eye video display device (SLh) of the eyewear (372). These video display devices (SRh, SLh) display the video images viewed by the user, where the video images (ImR, ImL) formed by the right-eye video display device and the left-eye video display device are at or near a horizontal orientation in front of the user, so that the user is able to view the working area located below eye level by using the video display devices, while working with ergonomically healthy sitting or standing posture and with minimal to no straining of the eyes, wherein the right-eye and left-eye video display devices can be separate devices, or can also be combined into one video display device that has part of its structure used as the right-eye video display device and another part of its structure used as the left-eye video display device. The video image (ImR) formed by the right-eye-side video display device (SRh) and the video image (ImL) formed by the left-eye-side video display device (SLh) allow the users to see their preferred working three-dimensional views with natural and realistic depth perception, while maintaining ergonomically healthy posture.

The electronic device (370) in FIG. 3(*j*) also comprises a headset (374) that comprises a pair of earphones (ER, EL), a headband (HB), and a microphone (Mic) that is connected to the left earphone (EL) with a moldable connector (376). The earphones (ER, EL) can provide the user with music, audio feedback, teleconferencing, and noise cancellation capabilities. The headband (HB) allows the user to wear the electronic device (370) comfortably. The microphone (Mic) can allow the user to control the electronic device (370) with his or her voice. The microphone (Mic) can also allow the user to communicate with others through teleconferencing, voice recording or sound recording. A motion sensor (IMU) is placed near the center of the eyewear. This motion sensor (IMU) allows contactless motion control of the electronic device (370). A right-eye-side camera (CR1), a left-eye-side camera (CL1), and a light source (LC1) are placed on the connector (376) near the microphone (Mic) as illustrated in FIG. 3(*j*). The angle between the viewing direction of the right-eye-side camera (CR1) and the eyewear viewing direction is the declination angle (AR1) of the right-eye-side camera (CR1); the angle between the viewing direction of the left-eye-side camera (CL1) and the eyewear viewing direction is the declination angle (AL1) of the left-eye-side camera (CL1); the angle between the eyewear viewing direction and the viewing direction of the light source (LC1) is the declination angle (AC1) of the light source (LC1); in this example, those angles (AL1, AR1, AC1) are designed to be the same or approximately the same, and they are adjustable by rotating a knob (378) or by adjusting the moldable connector (376) as illustrated in FIG. 3(*j*). These declination angles (AL1, AR1, AC1) are adjustable to be 45 degrees or larger, while typically adjusted to approximate the working declination angle (WDA), as illustrated in FIG. 2(*c*). These cameras (CR1, CL1) and light source (LC1) can also comprise light reflectors as shown by the example in FIG. 3(*h*). The right-eye-side camera (CR1) and the left-eye-side camera (CL1) capture the right and left views that the user wishes to see. These views are then processed and displayed by the right-eye video display device (SRh) and the left-eye video display device (SLh) in real-time. Methods and structures illustrated in FIGS. 4(*a-h*) can be used to reduce the Image Processing Delay Time (IPDT) of the electronic device (370). When the distance between cameras (CL1, CR1) and video displays (SLh, SRh) becomes larger, the camera control (490) circuits and display control (492) circuits may be implemented by separated components, other linked by wired or wireless interface, as illustrated by FIG. 4(*i*). FIG. 4(*i*) is a simplified block diagram for an exemplary controller that can be used to control the devices in FIG. 3(*j*) or FIG. 2(*d*). In FIG. 4(*i*), the camera controller and light source controller (490) are separated from the display controller (492) to allow flexibility with camera and light source locations. The light source controller can be used to control the light intensity, light color, and declination angle of the light source. If the device is equipped with a microphone, voice recognition (492) can be used as a contactless method for controlling the device. If the device is equipped with a motion sensor (IMU), contactless motion control can be used for controlling the device. If the device is equipped with magnetic switches (Mg+, Mg−, Mgp, Mgm), contactless magnetic control can be used for controlling the device. The distance between the two cameras (CR1, CL1) is adjustable in FIG. 3(*j*). The distance between the two cameras (CR1, CL1) is typically adjusted to approximate the interpupillary distance of the user (201), but can also be wider or narrower than the interpupillary distance of the user.

FIG. 2(*c*) is a symbolic diagram that shows a doctor (201) wearing the electronic device (370) illustrated in FIG. 3(*j*). In this example, the declination angle (CDA) of the camera (CL1) is adjusted to approximate the Working Declination Angle (WDA). The headband (HB) helps stabilize the electronic device (370) on the user's head. When the doctor (201) is working, his or her hands can become contaminated after touching the patient (102). Therefore, it is not practical for the doctor (201) to control the electronic device (370) by touching either the electronic device (370) or some other controller with his or her hands. One solution for this problem is to use contactless control devices that do not require touching, such as magnet switches, voice recognition, or motion sensors. The electronic device (370) in the example in FIG. 3(*j*) comprises four magnetic sensors (Mg+, Mg−, Mgp, Mgm). The doctor (201) in FIG. 2(*c*) can control these switches with a magnetic finger ring or a magnetic wristband. When the doctor (201) brings the magnetic finger ring or wristband close to one of the magnetic sensors (Mg+, Mg−, Mgp, Mgm), the switches can activate without touch. This kind of magnetic activation can be performed even when a glove is worn over the magnetic ring or wristband of the doctor (201). The magnetic sensors (Mg+, Mg−, Mgp, Mgm) illustrated in FIG. 3(*j*) can be placed anywhere on the electronic device (370), and do not need to be fixed in the positions illustrated on the figure. The magnetic sensors (Mg+, Mg−, Mgp, Mgm) can be located anywhere on the eyewear (372) or headset (374) of the device. The magnetic sensors can be placed in a variety of other locations as well, and do not have to be attached to the electronic device. The magnetic sensors can be placed on a mechanical arm, battery, wire, attached controller, or wireless control device. Though our examples in FIG. 3(*j*), FIG. 4(*i*) and FIG. 6(*a*) include 4 magnetic sensors, fewer magnetic sensors or more magnetic sensors can be used to control an electronic device as well. An electronic device can be controlled by a single magnetic sensor, or by multiple magnetic sensors. One or more magnetic sensors can also be used to control other electronic devices such as those illustrated in FIG. 3(*a-j*). One or more magnetic sensors can also be used to control light sources that can attach to dental loupes and other types of headwear. Though we mention that a doctor (201) or user can use a magnetic finger ring or wristbands to control the magnetic sensors, other magnetic wearables or magnetic handheld devices can also be used to control the magnetic sensors.

Figure 6A:
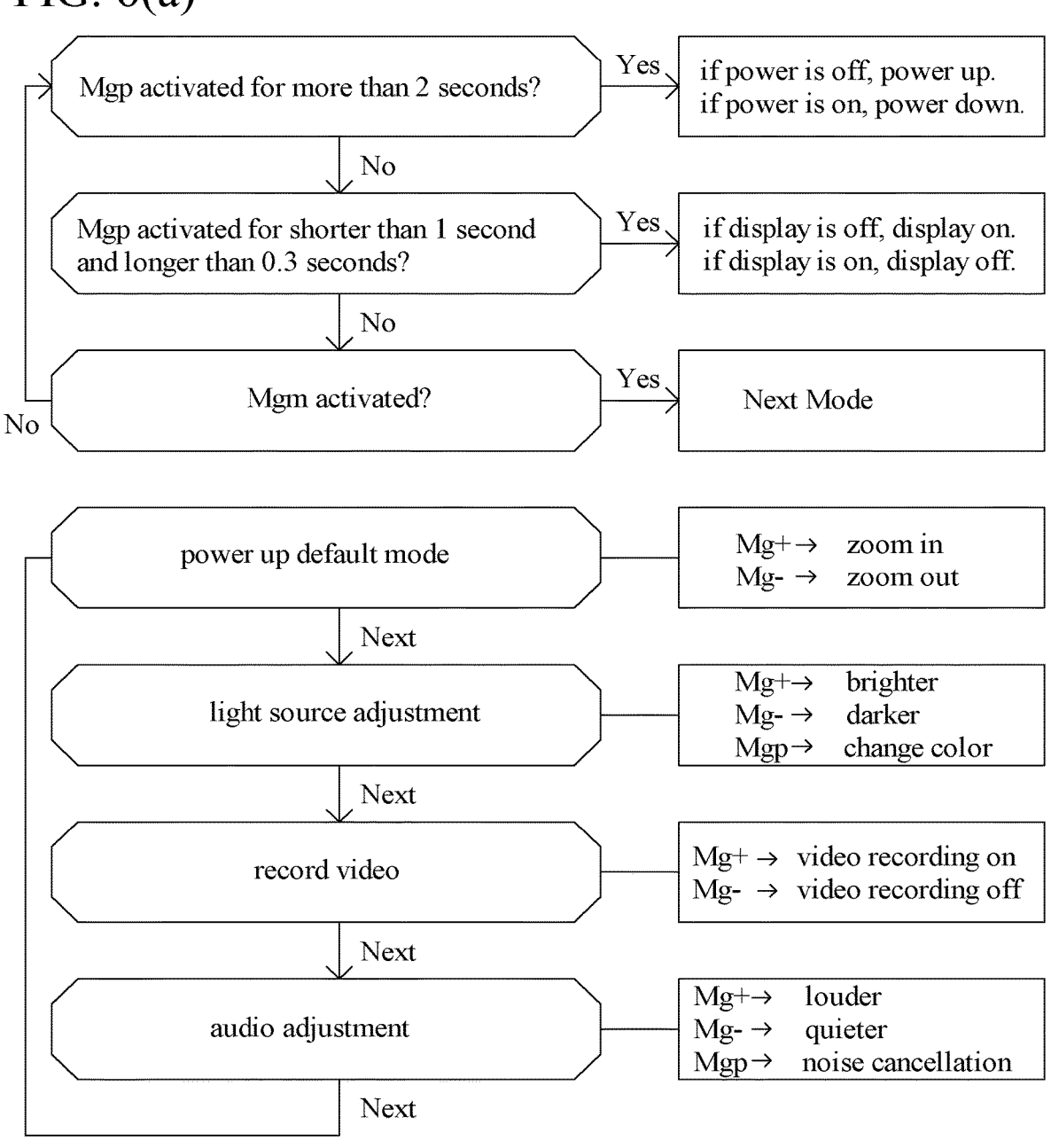
FIG. 6(a) is an exemplary flow chart illustrating operations of the magnetic sensors (Mg+, Mg−, Mgp, Mgm) in FIG. 3(j)
Figure 6B:
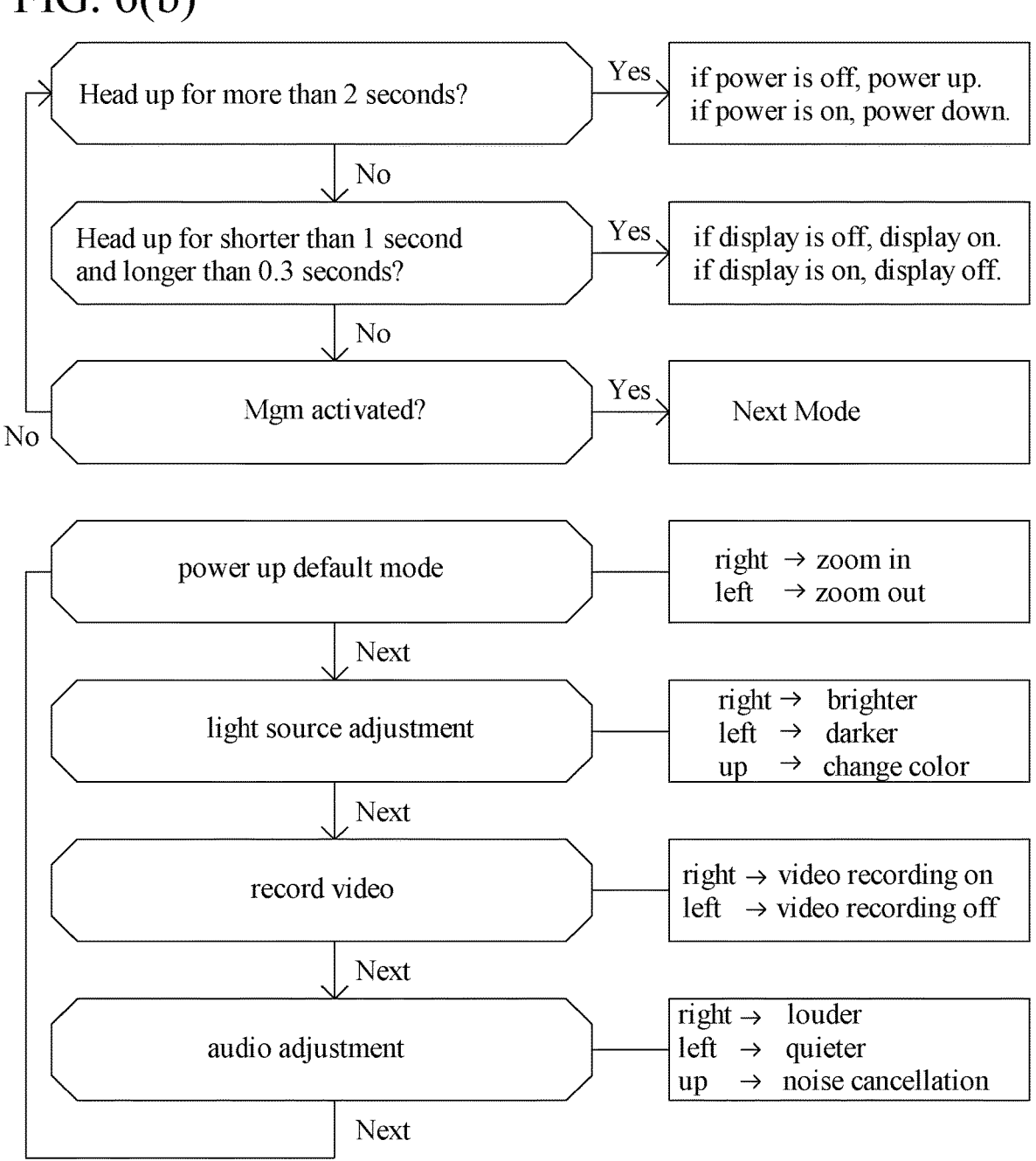
FIG. 6(b) is an exemplary flow chart illustrating contactless control using the motion sensor (IMU) in FIG. 3(j).

FIG. 6(*a*) is an exemplary flow chart illustrating operations of the magnetic sensors (Mg+, Mg−, Mgp, Mgm) in FIG. 3(*j*). When the Mgp magnetic sensor is activated for longer than 2 seconds, the device will power up if it is currently powered off. Conversely, when the Mgp magnetic sensor is activated for longer than 2 seconds, the device will power down if it is currently powered on. When the Mgp magnetic sensor is activated for longer than 0.3 seconds but shorter than 1 second, the video displays will turn on if they are currently turned off. Conversely, when the Mgp magnetic sensor is activated for longer than 0.3 seconds but shorter than 1 second, the video displays will turn off if they are currently turned on. When the Mgm magnetic sensor is activated, the device cycles to a different operation mode. When the device powers up from a power off state, it will start in a power up default mode. In this power up default mode, activation of Mg+ will cause the cameras to zoom in, and activation of Mg− will cause the cameras to zoom out. Activation of Mgm during the power up default mode will switch the device to a light source adjustment mode. In light source adjustment mode, activation of Mg+ will make the light source brighter, activation of Mg− will make the light source darker, and activation of Mgp will change the color of the light emitted by the light source. For example, the light source (LC1) can comprise light emitting diodes (LED) of red, green, and blue colors. When the light intensities of red, green, and blue LEDs are approximately equal, the light color is white. In light adjustment mode, when Mgp is activated while the light color is white, the blue LED is turned off, and the light color becomes yellow; when Mgp is activated while the light color is yellow, the light intensity of the green LED is reduced by about 50%, and the light color becomes orange; and when Mgp is activated while the light color is orange, the light color is changed back to white. Such color changes also can be executed by placing or changing filters in front of the light source (LC1). Activation of Mgm during light source adjustment mode will switch the device to a video recording mode. In video recording mode, activation of Mg+ starts video recording, and activation of Mg− stops video recording. Activation of Mgm during video recording mode will switch the device to an audio adjustment mode. In audio adjustment mode, activation of Mg+ increases audio volume, activation of Mg− reduces audio volume, and activation of Mgp provides noise cancellation. Activation of Mgm in audio adjustment mode switches the device back to power up default mode.

While the preferred embodiments have been illustrated and described herein, other modifications and changes will be evident to those skilled in the art. It is to be understood that there are many other possible modifications and implementations so that the scope of the invention is not limited by the specific embodiments discussed herein. For example, instead of using magnetic sensors, voice recognition using the voice detected by a microphone (Mic) can also be used to control all of the functions in FIG. 6(*a*). Motion sensors can also be used to control all of the functions in FIG. 6(*a*). As an example, using a motion sensor (IMU) located at the position illustrated in FIG. 3(*j*), the head orientation of the user can be determined accurately; when the user tilts his or her head significantly upward, the upward motion of the head can activate the aforementioned functions of Mgp. When the user turns his or her head significantly to the right, this rightward motion of the head can activate the aforementioned functions of Mg+. When the user turns his or her head significantly to the left, this leftward motion of the head can activate the aforementioned functions of Mg−. When the user tilts his or her head significantly downward, the downward motion of the head can activate the aforementioned functions of Mgm. The flow chart in FIG. 6(*b*) illustrates how head motions can be used to control the electronic device (370). When the user tilts his or her head significantly upward for longer than 2 seconds, the device will power up if it is currently powered off. Conversely, when the user tilts his or her head significantly upward for longer than 2 seconds, the device will power down if it is currently powered on. When the user tilts his or her head significantly upward for longer than 0.3 seconds but shorter than 1 second, the video displays will turn on if they are currently turned off. Conversely, when the user tilts his or her head significantly upward for longer than 0.3 seconds but shorter than 1 second, the video displays will turn off if they are currently turned on. When the Mgm magnetic sensor is activated, the device cycles to a different operation mode. When the device powers up from a power off state, it will start in a power up default mode. In this power up default mode, if the user turns his or her head significantly to the right, the cameras will zoom in. In the power up default mode, if the user turns his or her head significantly to the left, the cameras will zoom out. Activation of Mgm during the power up default mode will switch the device to a light source adjustment mode. In light source adjustment mode, if the user turns his or her head significantly to the right, the light source will become brighter. In light source adjustment mode, if the user turns his or her head significantly to the left, the light source will become darker. In light source adjustment mode, if the user tilts his or her head significantly upward, the color of the light emitted by the light source will change. Activation of Mgm during light source adjustment mode will switch the device to a video recording mode. In video recording mode, if the user turns his or her head significantly to the right, video recording will begin. In video recording mode, if the user turns his or her head significantly to the left, video recording will stop. Activation of Mgm during video recording mode will switch the device to an audio adjustment mode. In audio adjustment mode, if the user turns his or her head significantly to the right, audio volume will increase. In audio adjustment mode, if the user turns his or her head significantly to the left, audio volume will decrease. In audio adjustment mode, if the user tilts his or her head significantly upward, noise cancellation can be turned on or off. Activation of Mgm in audio adjustment mode switches the device back to power up default mode. Though this example assigns specific functions to the up, right and left motions of the head, it should be noted that each of these three motions can be assigned to activate any of the functions described in FIG. 6(*a*) and FIG. 6(*b*). These motions can also activate other functions not mentioned in FIG. 6(*a*) and FIG. 6(*b*) as well. Other head motions, such as downward tilt of the head, diagonal movement of the head, or left and right tilting of the head, can also be used to control the electronic device (370). Other bodily movement, such as movement of the arms or torso, can also be used to control the electronic device (370). Though our example in FIG. 3(*j*) includes only one motion sensor (IMU), more than one motion sensor can be used for controlling the electronic device (370) as well. The motion sensor (IMU) illustrated in FIG. 3(*j*) can be placed anywhere on the electronic device (370), and does not need to be fixed in the position illustrated on the figure. The motion sensor (IMU) can be located anywhere on the eyewear (372) or headset (374) of the device. The motion sensor can be placed in a variety of other locations as well, and does not have to be attached to the electronic device (370). The motion sensor can be placed on a mechanical arm, battery, wire, attached controller, or wireless control device. A motion sensor can also be used to control other electronic devices such as those illustrated in FIGS. 3(*a-j*). A motion sensor can also be used to control light sources that can attach to dental loupes and other types of headwear.

FIG. 2(*d*) shows a doctor (201) wearing another exemplary embodiment (240) of this patent application that places a camera (CL2) on a mechanical arm (242). This arm (242) can be attached to a piece of furniture, equipment, fixture, wall, window, floor, ceiling, counter, door, or other nearby attachment. The arm (242) is controlled by the user (201) manually, or through wired or wireless interfaces (not shown). Wireless interfaces include WiFi and Bluetooth. By controlling the arm (242), the doctor (201) can adjust the distance, location, and camera declination angle (CDA). The views captured by the camera (CL2) are processed and displayed by the video display device (SL) of the eyewear (240) in this example. The magnification of the image viewed by the doctor (201) can be controlled not only by zoom in/out functions, but also by changing the distance from the camera (CL2) to the working area. In this example, the declination angle (CDA) of the camera (CL2) is adjusted to approximate the Working Declination Angle (WDA).

While the preferred embodiments have been illustrated and described herein, other modifications and changes will be evident to those skilled in the art. It is to be understood that there are many other possible modifications and implementations so that the scope of the invention is not limited by the specific embodiments discussed herein. For instance, the video projectors in FIG. 3(*e, f* and *j*) do not always need to be placed on the sides of the eyewear. The video projectors can also be placed in a variety of other locations, including the front of the eyewear, bottom of the eyewear, or top of the eyewear. Likewise, the video display devices in FIGS. 3(*a-d*) do not always need to be placed on or near the top of the eyewear. Instead, the video display devices can also be placed in a variety of other locations, including the bottom of the eyewear or the sides of the eyewear. The electronic device in FIG. 3(*j*) includes two cameras on the microphone, but a single camera can also be placed on or near the microphone instead of two cameras. The electronic device in FIG. 3(*j*) additionally includes two video display devices, but a single video display device can also be used instead of two video display devices. The earphones, light source, microphone, cameras, magnetic sensors, motion sensor, and eyewear of the electronic device in FIG. 3(*j*) can exist as a single connected device or as multiple separate devices. The earphones, light source, microphone, cameras, magnetic sensors, motion sensor, and eyewear of the electronic device in FIG. 3(*j*) can also exist in many other kinds of designs, and the device does not have to include the headband (HB) or moldable connector (376). For example, the device can include a single earphone and a microphone, instead of two earphones and a microphone. The earphones can be in the form of a headset, headphones, earbuds, or other design. The device can also include a microphone without any earphones. The device can also include one or two earphones without any microphones. The microphone can be attached to the user's left ear or earphone, or to the user's right ear or earphone, depending on the user's preference. The microphone can also be attached to the user's clothing, to the eyewear, to the headband, or to another nearby area. The light source can exist as a single light or as multiple lights. The light source can be placed anywhere on a headwear, such as those illustrated in FIGS. 3(*a-g, i* and *j*). The light source can also be attachable and detachable from a headwear. The light source also does not have to be attached to the eyewear or headwear, and can instead be attached to the user's clothing or other nearby area. A contactless control light source can even be a separate device that can attach to dental loupes and other types of headwear as a supplement. The cameras of the eyewear in FIGS. 3(*a-g, i* and *j*) do not have to be attached to the mic, eyewear, or other piece of headwear, and can instead be attached to a piece of clothing, furniture, equipment, fixture, wall, window, floor, ceiling, counter, door, or other nearby attachment, as illustrated in FIG. 2(*d*).

While specific embodiments of the invention have been illustrated and described herein, it is realized that other modifications and changes will occur to those skilled in the art. It is therefore to be understood that the appended claims are intended to cover all modifications and changes that fall within the true spirit and scope of the invention.

What is claimed is:

1. An electronic device comprising:
a light source designed to attach to a headwear, where this light source is capable of illuminating objects or patients in a working area below eye level at a Working Declination Angle (WDA) of 45 degrees or larger while attached to the headwear, where WDA is defined as the angle between the horizontal plane and the line from the viewer's eyes to the working area, where the horizontal plane is used to approximate a viewer's unstrained, straight viewing direction while sitting or standing with ergonomically healthy posture; and
a contactless control device, where a contactless control device is a device that uses changes in magnetic fields, changes in electrical outputs of one or more motion sensors, changes in sound waves, or changes in electromagnetic waves to control the light source;
where the light emitted by the light source can switch between a plurality of different colors by using the contactless control device.

2. The contactless control device of the electronic device in claim 1 comprises a magnetic sensor.

3. The contactless control device of the electronic device in claim 1 comprises an accelerometer, gyroscope, magnetometer, or a combination of these sensors.

4. The light source of the electronic device in claim 1 comprises a plurality of light-emitting diodes of different colors.

5. The light intensity of the light source of the electronic device in claim 1 can be changed by using the contactless control device.

* * * * *